United States Patent
Nam et al.

(10) Patent No.: US 11,089,579 B2
(45) Date of Patent: Aug. 10, 2021

(54) METHOD AND APPARATUS FOR SUPPORTING MULTIPLE SERVICES IN ADVANCED MIMO COMMUNICATION SYSTEMS

(71) Applicant: Samsung Electronics Co., Ltd, Suwon-si (KR)

(72) Inventors: Young-Han Nam, Plano, TX (US); Thomas David Novlan, Dallas, TX (US); Boon Loong Ng, Plano, TX (US); Sudhir Ramakrishna, Plano, TX (US); Li Guo, Allen, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 15/346,584

(22) Filed: Nov. 8, 2016

(65) Prior Publication Data
US 2017/0201968 A1 Jul. 13, 2017

Related U.S. Application Data

(60) Provisional application No. 62/278,165, filed on Jan. 13, 2016, provisional application No. 62/316,206, (Continued)

(51) Int. Cl.
*H04W 72/04* (2009.01)
*H04L 5/00* (2006.01)
(Continued)

(52) U.S. Cl.
CPC ........ *H04W 72/042* (2013.01); *H04B 7/0452* (2013.01); *H04B 7/0632* (2013.01); (Continued)

(58) Field of Classification Search
CPC . H04W 72/042; H04W 72/048; H04W 4/005; H04W 72/04; H04W 4/70; (Continued)

(56) References Cited

U.S. PATENT DOCUMENTS

2014/0044064 A1 2/2014 Nangia et al.
2014/0177607 A1 6/2014 Li et al.
(Continued)

OTHER PUBLICATIONS

"NGMN 5G White Paper," NGMN Alliance, Version 1.0, Feb. 17, 2015, 126 pages.
(Continued)

*Primary Examiner* — Walter J Divito
*Assistant Examiner* — Anthony Luo

(57) ABSTRACT

A user equipment (UE) in a wireless communication system. The UE comprises at least one processor configured to determine a first subcarrier spacing and a transceiver configured to transmit, to a base station (BS), random access signals generated with the first subcarrier spacing and receive a downlink control signaling comprising a physical (PHY) resource configuration that includes a second subcarrier spacing. The UE further comprises at least one processor configured to set the PHY resource configuration for at least one of uplink transmission or downlink reception.

20 Claims, 25 Drawing Sheets

Related U.S. Application Data filed on Mar. 31, 2016, provisional application No. 62/356,216, filed on Jun. 29, 2016.

(51) Int. Cl.
| | | |
|---|---|---|
| *H04B 7/0452* | (2017.01) | |
| *H04B 7/06* | (2006.01) | |
| *H04W 4/70* | (2018.01) | |
| *H04W 24/10* | (2009.01) | |

(52) U.S. Cl.
CPC .......... *H04L 5/0007* (2013.01); *H04L 5/0048* (2013.01); *H04L 5/0091* (2013.01); *H04W 4/70* (2018.02); *H04W 72/048* (2013.01); *H04W 72/0446* (2013.01); *H04W 24/10* (2013.01)

(58) Field of Classification Search
CPC ........ H04W 24/10; H04L 5/0048; H04L 5/00; H04B 7/0452; H04B 7/06
See application file for complete search history.

(56) References Cited

U.S. PATENT DOCUMENTS

| | | | |
|---|---|---|---|
| 2015/0351098 A1 | 12/2015 | Schellmann et al. | |
| 2017/0019813 A1* | 1/2017 | Kim | ...................... H04W 24/08 |
| 2017/0086049 A1* | 3/2017 | Vrzic | .................... H04L 67/327 |
| 2017/0094547 A1* | 3/2017 | Yum | ........................ H04L 5/00 |
| 2017/0171843 A1* | 6/2017 | Abe | ..................... H04W 72/042 |
| 2017/0359805 A1* | 12/2017 | You | ..................... H04W 72/042 |

OTHER PUBLICATIONS

"3rd Generation Partnership Project; Technical Specification Group Services and System Aspects; Feasibility Study on New Services and Markets Technology Enablers, Stage 1, (Release 14)," 3GPP TR 22.891, V1.1.0, Nov. 2015, 97 pages.

Foreign Communication From a Related Counterpart Application, PCT Application No. PCT/KR2017/000468, International Search Report dated Apr. 24, 2017, 3 pages.

Foreign Communication From a Related Counterpart Application, PCT Application No. PCT/KR2017/000468, Written Opinion dated Apr. 24, 2017, 7 pages.

3GPP TR 22.891 V1.2.0 (Nov. 2015) Technical Report 3rd Generation Partnership Project; Technical Specification Group Services and System Aspects; Feasibility Study on New Services and Markets Technology Enablers; Stage 1 (Release 14)—11 Pages.

Indian Patent Office, Examination Report regarding Application No. 201837029583, dated Jun. 23, 2021, 6 pages.

* cited by examiner

METHOD AND APPARATUS FOR SUPPORTING MULTIPLE SERVICES IN ADVANCED MIMO COMMUNICATION SYSTEMS

CROSS-REFERENCE TO RELATED APPLICATIONS AND CLAIM OF PRIORITY

The present application claims priority to U.S. Provisional Patent Application Ser. No. 62/278,165, filed on Jan. 13, 2016, entitled "Method and Apparatus for Supporting Multiple Services in Advanced MIMO Communication Systems;" U.S. Provisional Patent Application Ser. No. 62/316,206, filed on Mar. 31, 2016, entitled "Frame Structure to Support Multiple OFDM Numerologies;" and U.S. Provisional Patent Application Ser. No. 62/356,216, filed on Jun. 29, 2016, entitled "Method and Apparatus for Supporting Multiple Services in Advanced MIMO Communication Systems." The content of the above-identified patent documents are incorporated herein by reference.

TECHNICAL FIELD

The present application relates generally to advanced communication systems. More specifically, this disclosure relates to multiple services in advanced communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks should provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE).

Embodiments of the present disclosure provide multiple services in advanced communication systems.

In one embodiment, a user equipment (UE) in a wireless communication system is provided. The UE includes at least one processor configured to determine a first subcarrier spacing and a transceiver configured to transmit, to a base station (BS), random access signals generated with the first subcarrier spacing and receive a downlink control signaling comprising a physical (PHY) resource configuration that includes a second subcarrier spacing. The UE further includes the at least one processor configured to set the PHY resource configuration for at least one of uplink transmission or downlink reception.

In another embodiment, the base station (BS) in a wireless communication system is provided. The BS includes a transceiver is further configured to receive, from a user equipment (UE), random access signals generated with a first subcarrier spacing and transmit a downlink control signaling comprising a physical (PHY) resource configuration that includes a second subcarrier spacing. The BS further includes at least one processor configured to set the PHY resource configuration for at least one of uplink reception or downlink transmission.

In yet another embodiment, a method of user equipment (UE) in a wireless communication system is provided. The method comprises determining a first subcarrier spacing, transmitting, to a base station (BS), random access signals generated with the first subcarrier spacing, receiving a downlink control signaling comprising a physical (PHY) resource configuration that includes a second subcarrier spacing, and setting the PHY resource configuration for at least one of uplink transmission or downlink reception.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TR 22.891 v1.2.0, "Study on New Service and Markets Technology Enablers."

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
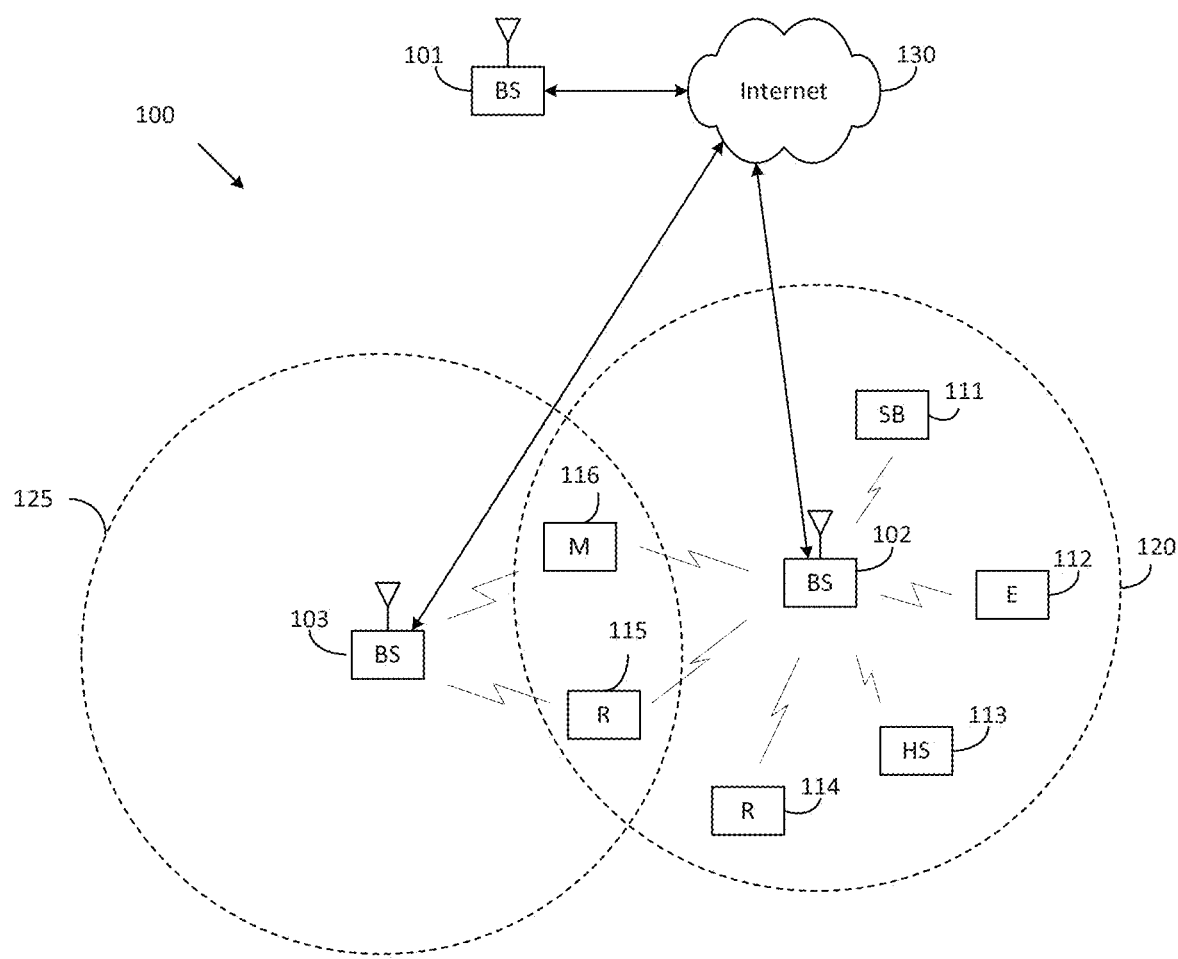
FIG. 1 illustrates an example wireless network according to embodiments of the present disclosure.
Figure 2:
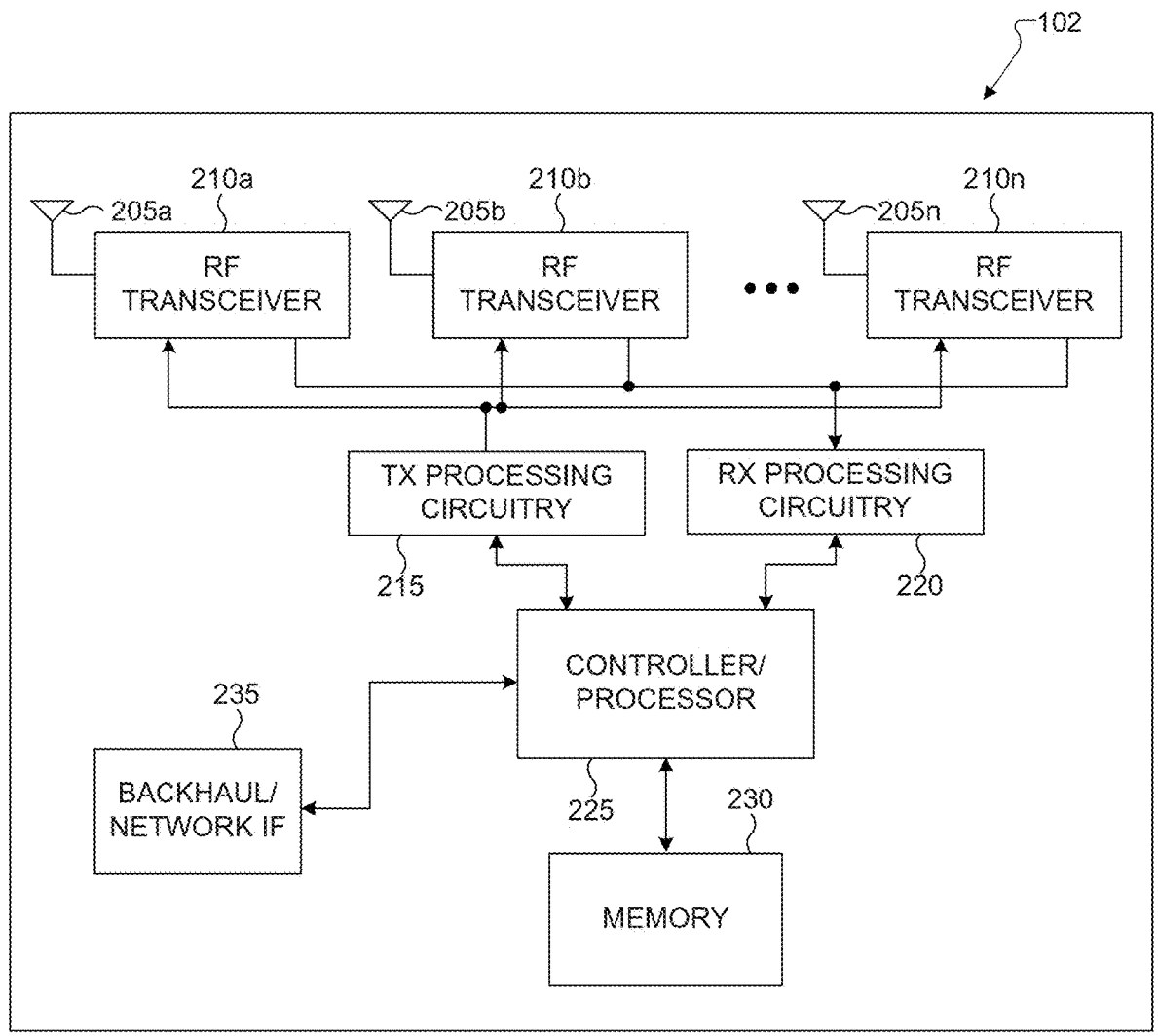
FIG. 2 illustrates an example eNB according to embodiments of the present disclosure.
Figure 3:
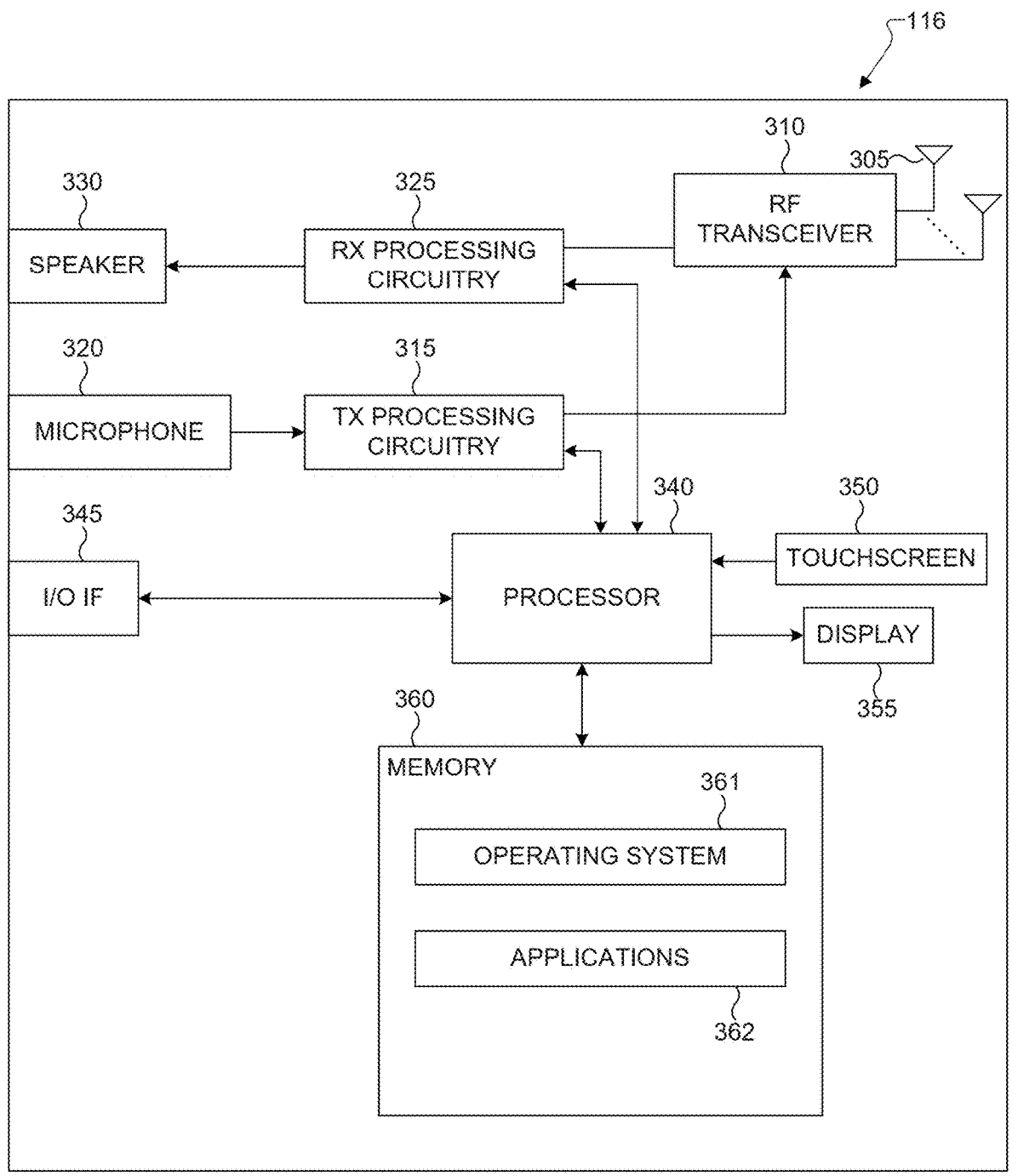
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 100 illustrates an example wireless network according to embodiments of the present disclosure. The embodiment of the wireless network shown in FIG. 1 100 is for illustration only. Other embodiments of the wireless network 100 could be used without departing from the scope of this disclosure.

As shown in FIG. 1 100, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 100 illustrates one example of a wireless network, various changes may be made to FIG. 1 100. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 200 illustrates an example eNB 102 according to embodiments of the present disclosure. The embodiment of the eNB 102 illustrated in FIG. 2 200 is for illustration only, and the eNBs 101 and 103 of FIG. 1 100 could have the same or similar configuration. However, eNBs come in a wide variety of configurations, and FIG. 2 200 does not limit the scope of this disclosure to any particular implementation of an eNB.

As shown in FIG. 2 200, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is also capable of receiving, from a user equipment (UE), random access signals generated with a first subcarrier spacing and transmitting a downlink control signaling comprising a physical (PHY) resource configuration that includes a second subcarrier spacing.

In some embodiments, the RF transceiver 210a-201n is also capable of transmitting the PHY resource configuration in a subband that is located on a center of a system bandwidth, the subband including downlink synchronization signals and performing the at least one of uplink reception or downlink transmission according to the PHY resource configuration.

In some embodiments, the RF transceiver 210a-201n is also capable of transmitting a downlink control signaling comprising multiple PHY resource configurations each of which includes a subcarrier spacing value.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 includes at least one microprocessor or microcontroller. As described in more detail below, the eNB 102 may include circuitry, programming, or a combination thereof for processing of CSI reporting on PUCCH. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is also capable of setting the PHY resource configuration for at least one of uplink reception or downlink transmission.

In such embodiments, the PHY resource configuration comprises a plurality of configurations that includes a subcarrier spacing value and a subband, the subcarrier spacing value to be used for the subband for the at least one of uplink reception or downlink transmission. In such embodiments, the PHY resource configuration further comprises information indicating an existence of a blank interval on boundaries of consecutive slots on which the UE is scheduled to receive a number of transport blocks. In such embodiments, the PHY resource configuration further comprises information to generate a reference signal scrambling sequence. In such embodiments, the PHY resource configuration comprises resources corresponding to at least one of ultra reliable and low latency (URLL) configuration information, enhanced mobile broadband (eMBB) configuration information, or massive machine type communication (mMTC) configuration information.

The memory 230 is coupled to the controller/processor 225. Part of the memory 230 could include a RAM, and another part of the memory 230 could include a Flash memory or other ROM.

Although FIG. 2 200 illustrates one example of eNB 102, various changes may be made to FIG. 2 200. For example, the eNB 102 could include any number of each component shown in FIG. 2 200. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 200 could be combined, further subdivided, or omitted and additional components could be added according to particular needs.

FIG. 3 300 illustrates an example UE 116 according to embodiments of the present disclosure. The embodiment of the UE 116 illustrated in FIG. 3 300 is for illustration only, and the UEs 111-115 of FIG. 1 100 could have the same or similar configuration. However, UEs come in a wide variety of configurations, and FIG. 3 300 does not limit the scope of this disclosure to any particular implementation of a UE.

As shown in FIG. 3 300, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of transmitting, to a base station (BS), random access signals generated with the first subcarrier spacing and receiving a downlink control signaling comprising a physical (PHY) resource configuration that includes a second subcarrier spacing.

In some embodiments, the RF transceiver 310 is capable of receiving the PHY resource configuration in a subband that is located on a center of a system bandwidth, the subband including downlink synchronization signals and performing the at least one of uplink transmission or downlink reception according to the PHY resource configuration.

In some embodiments, the RF transceiver 310 is capable of receiving a downlink control signaling comprising multiple PHY resource configurations each of which includes a subcarrier spacing value.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of setting the PHY resource configuration for at least one of uplink transmission or downlink reception. In such embodiments. In such embodiments, the PHY resource configuration comprises a plurality of configurations that include a subcarrier spacing value and a subband, the subcarrier spacing value to be used for the subband for the at least one of uplink transmission or downlink reception. In such embodiments, the PHY resource configuration further comprises information indicating an existence of a blank interval on boundaries of consecutive slots on which the UE is scheduled to receive a number of transport blocks. In such embodiments, the PHY resource configuration further comprises information to generate a reference signal scrambling sequence. In such embodiments, the PHY resource configuration comprises resources corresponding to at least one of ultra reliable and low latency (URLL) configuration information, enhanced mobile broadband (eMBB) configuration information, or massive machine type communication (mMTC) configuration information.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 300 illustrates one example of UE 116, various changes may be made to FIG. 3 300. For example, various components in FIG. 3 300 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 300 illustrates the UE 116 configured as a mobile telephone or smartphone, UEs could be configured to operate as other types of mobile or stationary devices.

Figure 4A:
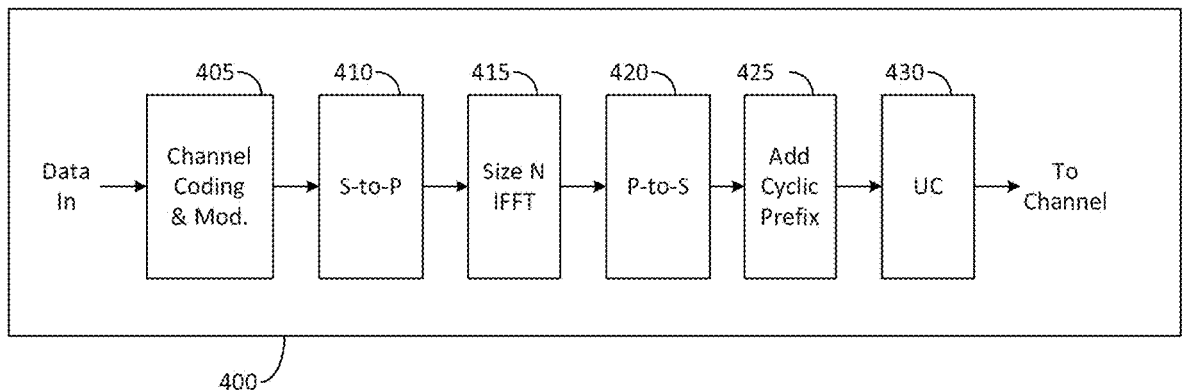
FIG. 4A illustrates a high-level diagram of an orthogonal frequency division multiple access transmit path according to embodiments of the present disclosure.
Figure 4B:
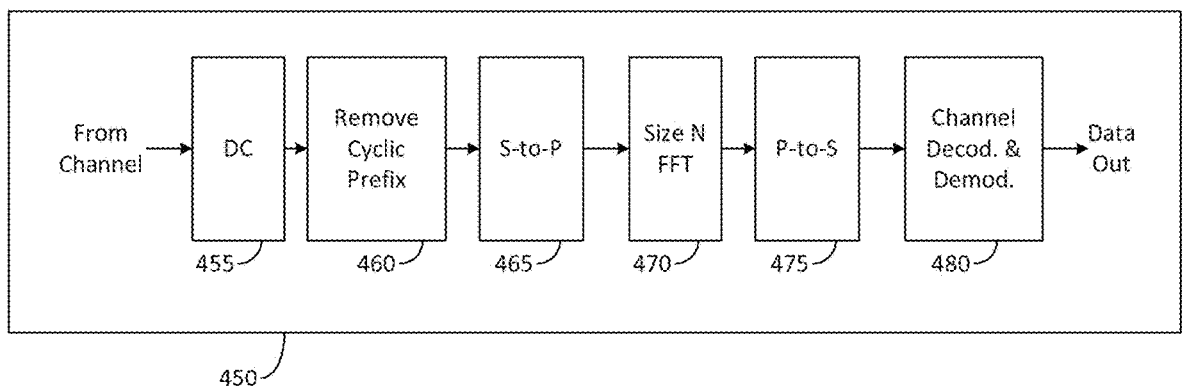
FIG. 4B illustrates a high-level diagram of an orthogonal frequency division multiple access receive path according to embodiments of the present disclosure.

FIG. 4A 400 is a high-level diagram of transmit path circuitry. For example, the transmit path circuitry may be used for an orthogonal frequency division multiple access (OFDMA) communication. FIG. 4B 450 is a high-level diagram of receive path circuitry. For example, the receive path circuitry may be used for an orthogonal frequency division multiple access (OFDMA) communication. In FIGS. 4A 400 and 4B 450, for downlink communication, the transmit path circuitry may be implemented in a base station (eNB) 102 or a relay station, and the receive path circuitry may be implemented in a user equipment (e.g. user equipment 116 of FIG. 1 100). In other examples, for uplink communication, the receive path circuitry 450 may be implemented in a base station (e.g. eNB 102 of FIG. 1 100) or a relay station, and the transmit path circuitry may be implemented in a user equipment (e.g. user equipment 116 of FIG. 1 100).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basis functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission scheme wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current invention, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE's data transmission/reception.

Figure 5:
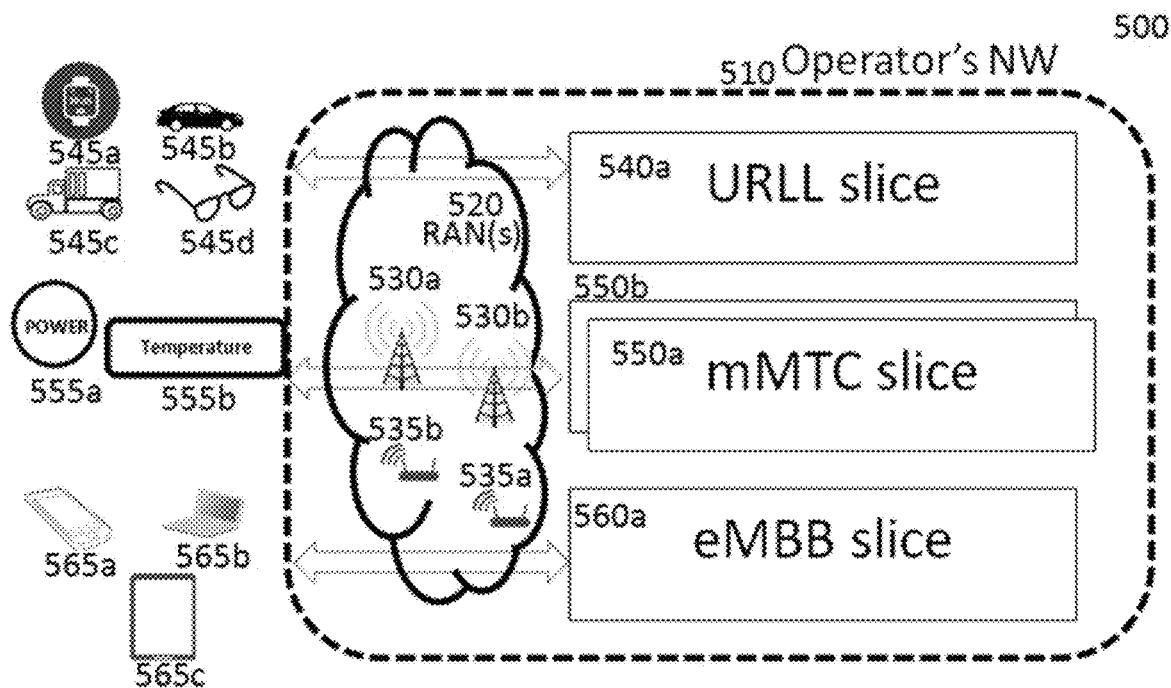
FIG. 5 illustrates a network slicing according to embodiments of the present disclosure.

FIG. 5 500 illustrates a network slicing according to embodiments of the present disclosure. An embodiment of the network slicing shown in FIG. 5 500 is for illustration only. One or more of the components illustrated in FIG. 5 500 can be implemented in specialized circuitry configured to perform the noted functions or one or more of the components can be implemented by one or more processors executing instructions to perform the noted functions. Other embodiments are used without departing from the scope of the present disclosure. As shown in FIG. 5 500, the network slicing comprises a operator's network 510, a plurality of RANS 520, a plurality of eNBs 530a, 530b, a plurality of small cell base station 535a, 535b, a URLL slice 540a, a smart watch 545a, a car 545b, a, truck 545c, a smart grasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a method to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 500 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
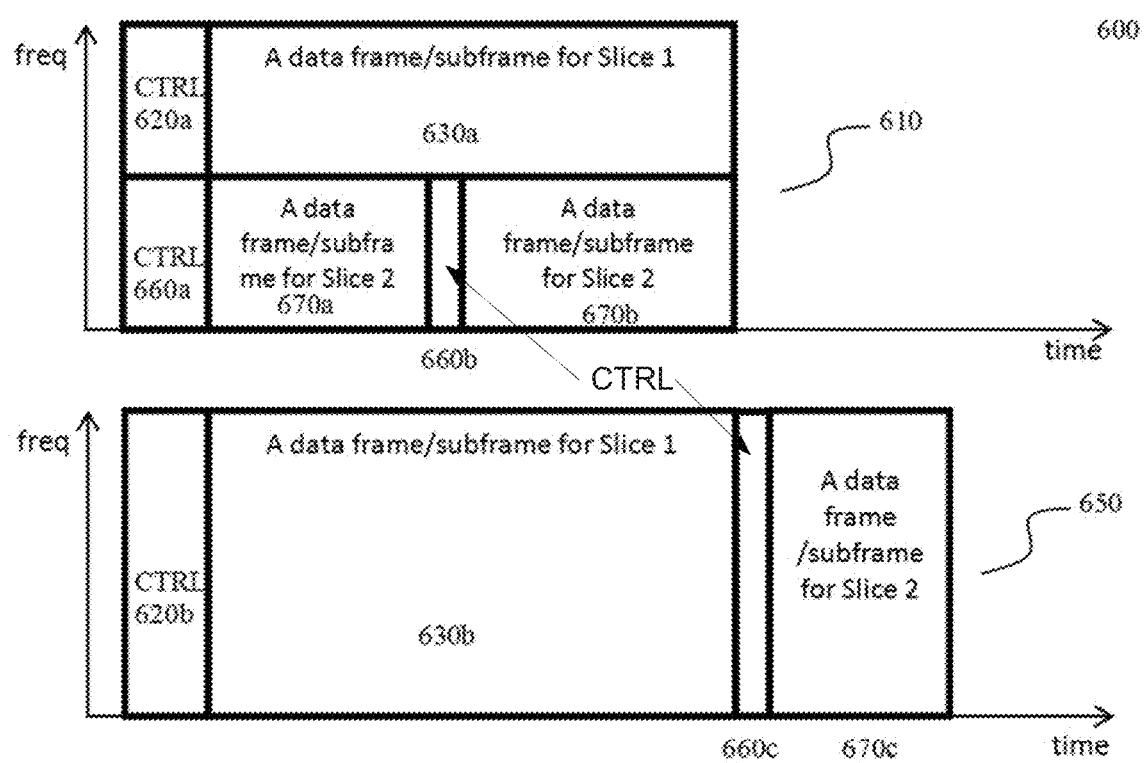
FIG. 6 illustrates a frame structure for a network to support two slices according to embodiments of the present disclosure.

FIG. 6 600 illustrates a frame structure for a network to support two slices according to embodiments of the present disclosure. An embodiment of the OFDM signals for a network to support two slices shown in FIG. 6 600 is for illustration only. One or more of the components illustrated in FIG. 6 600 can be implemented in specialized circuitry configured to perform the noted functions or one or more of the components can be implemented by one or more processors executing instructions to perform the noted functions. Other embodiments are used without departing from the scope of the present disclosure.

As shown in FIG. 6 600, the frame structure for a network to support two slices 600 comprises a first slice 610 and a second slice 650. Furthermore, the first slice 610 comprises a data (frame/subframe/TTI) interval 630a, a control (CTRL) interval 620a, 660a, and 660b, a data frame/subframe/TTI for slice (data interval) 2 670a, 670b. Similarly, the second slice 650 comprises a control (CTRL) 620b, a data frame/subframe/TTI for slice 1 630b, a control (CTRL) 660c, and a data frame/subframe/TTI for slice 2 670c.

In some embodiments, a UE is configured in the higher layer (e.g., RRC), to Tx/Rx signals related to the two slices, for example, slices 1 and 2, wherein slice 1 is the eMBB slice 560a and slice 2 is the URLL slice 540a. In some embodiments, the PHY signals related to the two slices are FDM'ed by the network as shown in 610. In one such embodiment, the two BWs corresponding to the two slices are subbands of a serving cell BW. In some embodiments, the two BWs corresponding to the two slices are two separate serving cell BWs. In this case, a guard BW may present between the two BWs corresponding to the two slices. In some embodiments, the PHY signals related to the two slices are TDM'ed by the network in a serving BW as shown in 650.

In some alternative embodiments, the PHY signals related to the two slices are CDM'ed by the network. In such embodiments, a first code is allocated to the PHY signals for a first slice, and a second code is allocated to the PHY signals for a second slice. In some embodiments, the PHY signals related to the two slices are SDM'ed. In such embodiment, a first precoder is applied to the PHY signal for a first slice and a second precoder is applied to the PHY signal for a second slice. In some embodiments, a first set of TPs Tx/Rx PHY signal for the first slice and a second set of TPs Tx/Rx PHY signal for the second slice. In some embodiments, PHY control and data Tx/Rx for those UEs are configured with a slice occurs within the time-frequency resources allocated for the configured slice.

In some embodiments, a subframe, which is (or may be) equivalent to a transmission-time-interval (TTI), comprises a control time-frequency resource and a data time-frequency resource. In such embodiments, a slice 1's subframe comprises a control interval 620a (or 620b) and a data interval 630a (or 630b). The control signaling in 620a (620b) indicates PHY data scheduling information in the time-frequency pool of 630a (or 630b) to those UEs configured with slice 1.

In some embodiments, a slice 2's subframe comprises a control interval 660a (or 660b or 660c) and a data interval 670a (or 670b or 670c). The control signaling in 660a (or 660b or 660c) may indicate PHY data scheduling information in the time-frequency pool of 670a (or 670b or 670c) to those UEs configured with slice 2. In some embodiments, a subframe length (or a TTI length) can be configured slice-specifically. In one example, a first TTI length is configured for a first slice and a second TTI length is configured for a second slice. In such embodiments, the first slice corresponds to slice 1 (the eMBB slice 160a), and the second slice corresponds to slice 2 (the URLL slice 140a) and the subframe length of a first slice is two times (m=2) longer than (in general, an integer multiple of) the subframe length of a second slice. In this case, the URLL slice 540a can meet the delay constraint (with having a half subframe length the latency becomes half) and the eMBB slice 560a can meet the spectral efficiency requirement (with having a double subframe length the corresponding control overhead becomes half). The integer relationship of the subframe lengths may help the network to FDM partition the slices more efficiently.

The specific integer (m) value can be explicitly or implicitly signaled to a UE or a UE's slice (or a virtual cell). In one example, the m value is indicated by a one-bit field conveyed, e.g., in a broadcast or a unicast signaling. In another example, state 0 implies m=1 and state 1 implies m=2. In yet another example, state 0 implies m=1 and state 1 implies m=4. In yet another example, state 0 implies m=2 and state 1 implies m=4. In yet example, the m value is indicated by a two-bit field conveyed, e.g., in a broadcast or a unicast signaling. In one example, state 00 implies m=1; state 01 implies m=2; state 10 implies m=4; and state 11 is reserved.

In some embodiments, the subframe length is described in terms of OFDM symbols. In one example, the subframe length of the eMBB slice (slice 1) 540a is 70 (=14×5 or alternatively 56=14×4) OFDM symbols, and the subframe length of the URLL slice (slice 2) is 14 OFDM symbols.

In some embodiments, length of a control interval (e.g., 620a/b, 660a/b/c) can be configured slice-specifically. In such embodiments, the length of control interval 620a of the eMBB slice (slice 1) 560a, is longer than the control interval 660b of the URLL slice (slice 2) 540a. The control interval of 660a/b can dynamically be adjusted to cope with different numbers of served UEs in the data frame 260a/b.

In some embodiments, the control interval (620a/b, 660a/b/c) corresponds to the PHY DL control interval, similarly to the PDCCH interval. In some embodiments, the region 630a/b and 670a/b/c correspond to a sequence of subframes that contain data only (i.e., no PHY control is embedded in 630 and 670a/b. In these cases, the control region 620a/b and 660a/b/c may correspond to a respective numbers of OFDM symbols.

In some embodiments, each of 630a/b and 670a/b/c, corresponds to a single self-contained subframe 610/615 for DL data transmission, in which uplink control signaling (A/N), 640a/b, is multiplexed at the end of the subframe 610/615.

Figure 7:
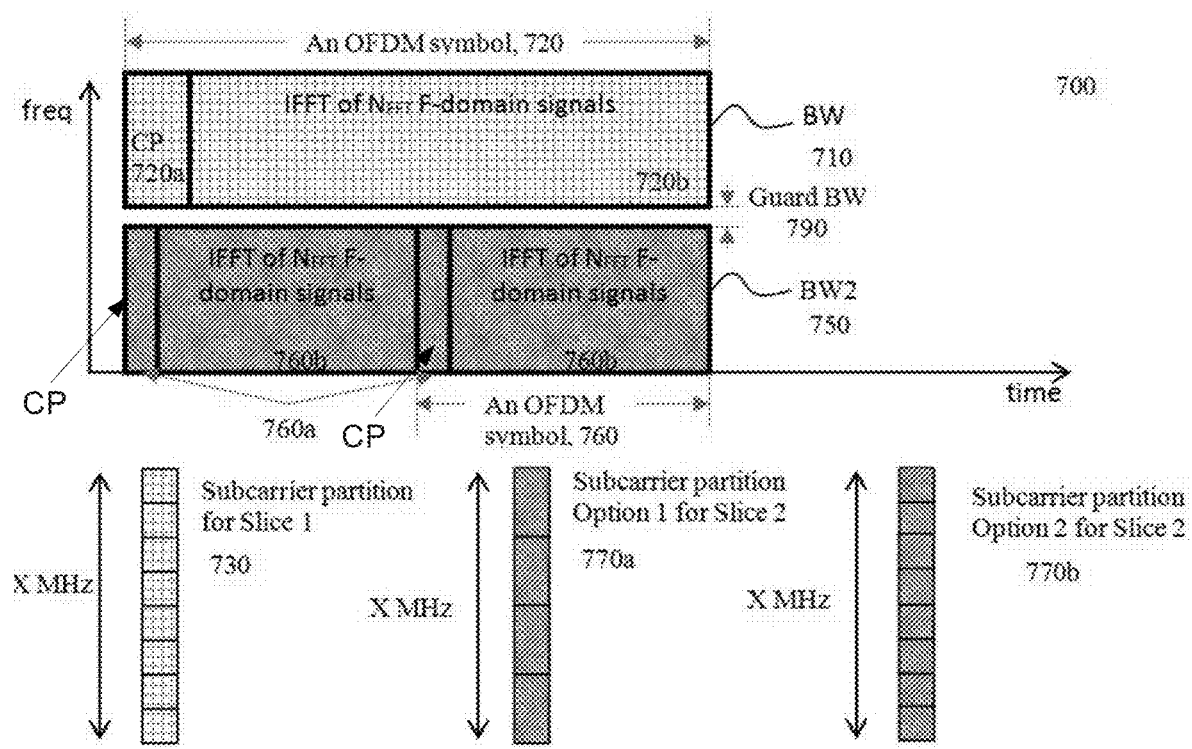
FIG. 7 illustrates an orthogonal frequency division multiplexing (OFDM) signals for a network to support two slices according to embodiments of the present disclosure.

FIG. 7 700 illustrates an orthogonal frequency division multiplexing (OFDM) signals for a network to support two slices according to embodiments of the present disclosure. An embodiment of the OFDM signals for a network to support two slices shown in FIG. 7 700 is for illustration only. One or more of the components illustrated in FIG. 7 700 can be implemented in specialized circuitry configured to perform the noted functions or one or more of the components can be implemented by one or more processors executing instructions to perform the noted functions. Other embodiments are used without departing from the scope of the present disclosure.

As shown in FIG. 7 700, the OFDM signals for the network to support two slices 700 comprises a plurality of BWs 710, 750, an OFDM symbol (duration) 720, 760, a CP 720a, a plurality of IFFTs 720b, 760a, 760b, a subcarrier partition for slice 1 730, a subcarrier partition option 1 for slice 2 770a, and a subcarrier partition option 2 for slice 2 770b.

FIG. 7 700 illustrates the OFDM symbols construction in order to facilitate a network to support two slices with FDM partitioning into two bands, BW1 710 and BW2 750, according to some embodiments of the current invention.

In some embodiments, PHY signals of a first slice reside within BW1 710, and PHY signals of a second slice reside within BW2 750. In one such embodiment, the first slice corresponds to the eMBB slice 560a and the second slice corresponds to the URLL slice 540a. Between the two BW partitions 710 and 750, a guard BW 790 may present. When the guard BW 790 is configured to a UE, the UE is not expected to Tx/Rx on the guard BW 790. The rejection/transition band of BW-specific filter can be located in BW corresponding to 790.

In some embodiments, a UE is configured to receive the two slices; and also configured with a same set of numerology parameters for the two BWs 710 and 750. In some embodiments, a UE is configured to receive the two slices; and also configured with two different sets of numerology parameters for the two BWs 710 and 750. In such embodiments, the numerology parameters include at least one of the CP length, subcarrier spacing, OFDM symbol length, FFT size, etc. In some embodiments, two separate bandpass digital filters are applied for the two BWs. In some embodiments, a high pass digital filter is applied to a first BW 710 and a low pass digital filter is applied to a second BW 750. In such embodiments, a guard BW 790 is exploited such that there is little interference from the two BWs 710 and 750, e.g., a rejection/transition band is placed in BW790. Furthermore, a number of subcarriers can be semi-statically higher-layer configured for the guard BW 790.

In some embodiments, an OFDM symbol duration comprises a cyclic prefix (CP) duration and a duration for IFFT of NFFT symbols. Then the OFDM symbol duration is determined as the sum of the two durations for the CP and the IFFT. In some embodiments, the OFDM symbol duration 720 for BW1 710 is configured two times (or an integer (n) multiple) larger than the OFDM symbol duration 760 of BW2 750. This is useful when supporting a wider coverage for the eMBB slice 560a operating in BW1 710 than the URLL slice 540a operating in BW2 350.

The specific integer (n) value can be explicitly or implicitly signaled to a UE or a UE's slice (or a virtual cell), similarly to the integer m according to some embodiments of the present disclosure. In some embodiments, n is equal to m, and a single signaling configures the values. In some embodiments, n and m are separately configured. In some embodiments, a UE configured to receive the two slices, receives a first service (slice) from a first TP, and a second service (slice) from a second TP. In such embodiments, the first and the second TPs respectively correspond to an eNB 530a and a small cell 530c.

In some embodiments, the first and the second TPs respectively correspond to a first eNB 530a and a second eNB 530b. Other combinations of network devices are also possible for supporting this operation mode.

In some embodiments, a CP length 720a configured for BW1 710 is longer than a CP length 720a configured for BW2 750. It is noted that the longer-CP length of 720a can cover a wider geographical area than the shorter-CP length of 720a.

In some embodiments, a CP length 720a for BW1 710 is the same as a CP length 720a for BW2 750. If the OFDM symbol length 720 is twice larger than the subframe length 760a/b, the CP overhead of BW1, 710 is the half of the CP length of BW2, 750, and hence BW1, 710, is more efficient than slice 2, 760 (OFDM symbol duration). In some embodiments, subcarrier spacing is separately configured for BW1 710 and BW2 750. In such embodiments, the subcarrier spacings are configured in such a way that the subcarrier spacing 770a of BW2, 750, is two times wider than (in general an integer (k) multiple of) the subcarrier spacing 730 of BW1, 710.

The specific integer (k) value can be explicitly or implicitly signaled to a UE or a UE's slice (or a virtual cell), similarly to the integer m and n according to some embodiments of the present disclosure. In some embodiments, all of n, m, and k are the same, and a single signaling configures the values. In some embodiments, all of n, m, and k are separately configured. In some embodiments, the subcarrier spacing values are configured in such a way that the subcarrier spacing 770b of BW2, 750, is the same as the subcarrier spacing 730 of BW1, 710.

Figure 8:
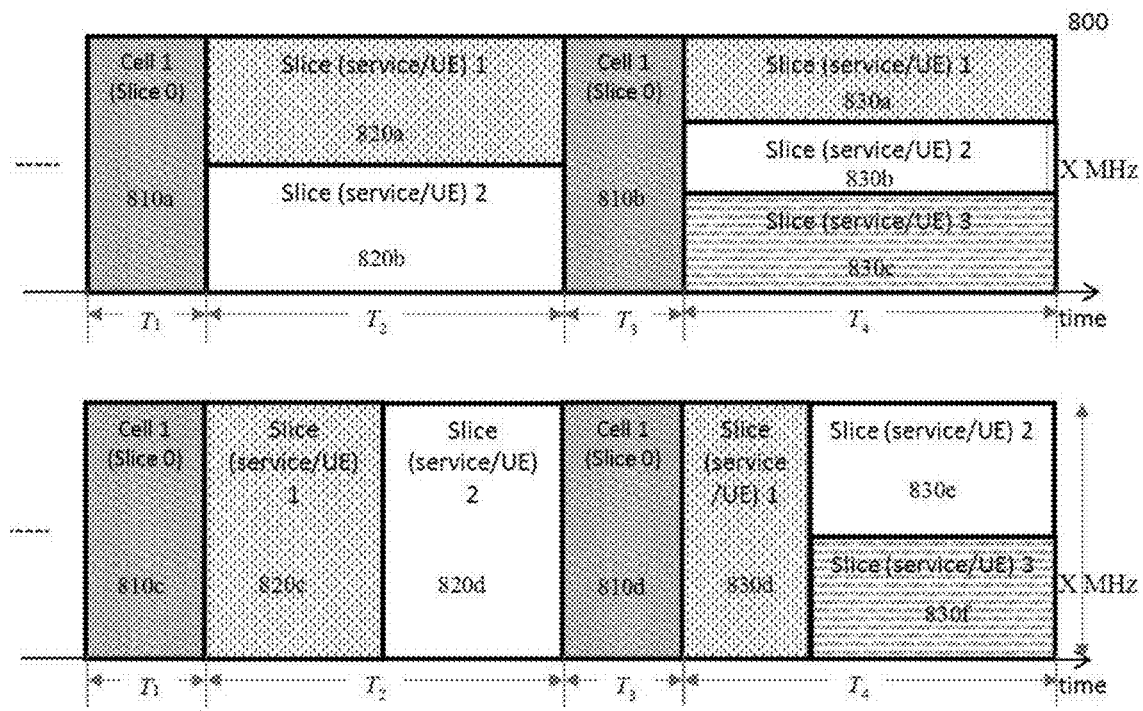
FIG. 8 illustrates a frame structure for a network to support multiple services according to embodiments of the present disclosure.

FIG. 8 800 illustrates a frame structure for a network to support multiple services according to embodiments of the present disclosure. An embodiment of the frame structure for a network to support multiple services shown in FIG. 8 800 is for illustration only. One or more of the components illustrated in FIG. 8 800 can be implemented in specialized circuitry configured to perform the noted functions or one or more of the components can be implemented by one or more processors executing instructions to perform the noted functions. Other embodiments are used without departing from the scope of the present disclosure.

As shown in FIG. 8 800, the frame structure for a network to support multiple services 800 comprises a plurality of cells (e.g., slices, services) 810a, 810b, 810c, and a plurality of cells (e.g., slices, services) 810d, 820a, 820b, 820c, 820d, 830a, 830b, 830c, 830d, 830e, and 830f.

The number of configured slices in the network can change in time. During the time duration of T1, the X MHz BW corresponds to a single serving cell (denoted as cell 1), or a single slice (denoted as slice 0), 810a, 810c. During the time duration of T2 followed by T1, in one alternative embodiment, two slices/services/UEs 820a, 820b are FDM'ed in the BW and in another alternative embodiment, two slices/services/UEs 820c, 820d are TDM'ed. During the time duration of T3 followed by T2, the X MHz BW operates as a single serving cell or a single slice, 810b, 810d, again. During the time duration of T4 followed by T3, in one alternative embodiment, three slices/services/UEs (830a, 830b, and 830c) are FDM'ed in the BW.

In some embodiments, slice/service/UE 1 830d is TDM'ed with slices/services/UEs 2 and 3, 830e, 830f, and slices/services/UEs 2 and 3, 830e and 830f, are FDM'ed. This frame structure provides flexibility to deploy the network in a time varying manner, to cope with time-varying sets of traffic types. In such embodiments, the number of configured slices in a BW of a network is time-varying. In one embodiment, the BW of X MHz comprises a cell 810a, 810b, 810c, 810d in time intervals of T1 and T3. The same BW is partitioned into BWs for the two slices 820a and 820b in time interval T2, and three BWs for the three slices 830a, 830b and 830c in time interval T4.

In some embodiments, control signaling conveyed in cell 1, 810a, 810b, 810c, 810d, contains information on the identity of the slices and time-frequency resources for the slices located in the next interval. In some embodiments, the network configures and operates according to a common time duration for the cell-based operation (i.e., T1=T3). In some embodiments, the network configures and operates according to a common time duration for the slice-based operation (i.e., T2=T4), regardless of the number of configured slices.

In some embodiments, cell-based operation 810a, 810b, 810c, 810d can also correspond to operation for a slice, say Slice 0, which can be referred to as an anchor slice. In some embodiments, the network configures and operates with periodically recurring cell-based (or anchor-slice) operation durations (time-frequency regions). In other words, the cell-based operation 810a, 810b, 810c, 810d and its previous and future recurrence occurs with a constant period P (in OFDM symbols, or alternatively in subframes/slots).

In some embodiments, the cell-based operation region 810a, 810b, 810c, 810d includes synchronization signals and primary broadcast signals (which contains essential broadcast information).

In some embodiments, synchronization signals and primary broadcast signals are transmitted in a contiguous subset of the X MHz during the cell-based operation 810a, 810b, 810c, 810d occurs (e.g., slice-common PHY channel). In such embodiments, the synchronization signals and primary broadcast signals are transmitted in a center subband of the X MHz. In such embodiments, an additional broadcast signaling is conveyed in the center subband of the XMHz to indicate the slice BW allocation in the subsequent time interval.

In some embodiments, the cell-based operation region 810a, 810b, 810c, 810d also includes a set of UL resources that can be used for UL random access for UL synchronization. In some embodiments, the anchor slices are used for control signaling Tx/Rx and non-anchor slices are used for data Tx/Rx. In FDD systems, the UL and the DL anchor slices are configured in the same time duration, i.e., T1 and T3 (810a, 810b, 810c, 810d).

In TDD systems, the time domain resource on which UL anchor slice is configured is a positive offset different from the time domain resource on which DL anchor slice is configured. In one example, if the DL anchor is configured in subframe n, the UL anchor is configured in subframe n+k, wherein k=1, 2, 3, 4, . . . . The offset number (k) can be configured explicitly in the DCI transmitted in the DL anchor slice, or implicitly e.g., by the RACH configuration.

In some embodiments, a UE is semi-statically higher-layer configured with one or more slices (or virtual cells). The UE is further configured to track the time frequency resources of every configured slice. In such embodiments (slice-common control signaling), the UE is configured to receive and process a control information transmitted in a cell-based operation region 810a, for obtaining information regarding the time frequency resources of every configured slice. Alternatively, in another such embodiment (slice-specific control signaling), the UE is configured to receive and process a control information transmitted in a cell-based operation region 810*a*, for obtaining information regarding the time frequency resources of each configured slice.

In some embodiments, the UE is configured to process N control signaling if the UE is configured with N slices, where N=1, 2, . . . . These N control signaling may be conveyed on N x physical downlink control channels (PDCCHs), whose cyclic redundancy checks (CRCs) are scrambled with slice-specific identifiers (IDs). For example, the CRC of a first control signaling for a first slice is scrambled with a first ID and the CRC of a second control signaling for a second slice is scrambled with a second ID, and so on.

Either slice-common or slice-specific can be either UE-specifically or cell-specifically signaled. In case the signaling is UE-specifically performed, the CRC(s) of the xPDCCH(s) are scrambled with the UE-ID (as well as either slice-specific ID(s) or slice-common ID).

Figure 9:
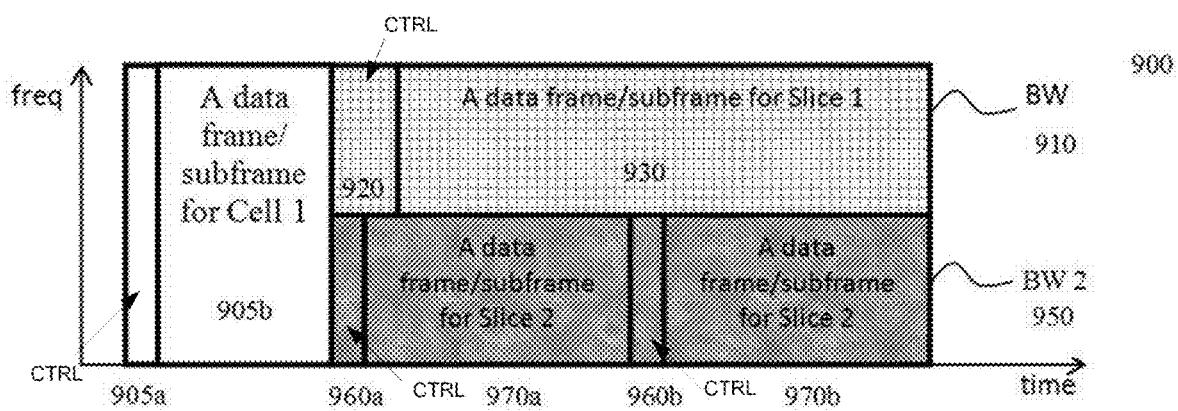
FIG. 9 illustrates another frame structure for a network to support multiple services according to embodiments of the present disclosure.

In some embodiments, the control information contains at least one of the following parameters: time duration of the next slice-specific frame, i.e., T2; a number of configured slices in T2; time/Frequency partition indication of every configured slice; and numerology parameters for every (or alternatively, a single) configured slice. Code block to RE mapping method (i.e., time-first or frequency first mapping according to FIG. 13 1300, FIG. 14 1400 or FIG. 15 1500) for every configured slice FIG. 9 900 illustrates another frame structure for a network to support multiple services according to embodiments of the present disclosure. An embodiment of the frame structure for a network to support multiple services shown in FIG. 9 900 is for illustration only. One or more of the components illustrated in FIG. 9 900 can be implemented in specialized circuitry configured to perform the noted functions or one or more of the components can be implemented by one or more processors executing instructions to perform the noted functions. Other embodiments are used without departing from the scope of the present disclosure.

As shown in FIG. 9 900, the frame structure for a network to support multiple services comprises a BW 1 910, a BW 2 950, a control (CTRL) 905, 920, 960*a*, 960*b*, a cells 905*b*, a data frame/subframe/TTI for slice 1 930, a data frame/subframe/TTI for slice 2 970*a*, 970*b*.

In some embodiments, during a first time duration corresponding to cell-based (or anchor-slice) control, 905*a*, and a data frame/subframe/TTI for cell 1, 905*b*, full BW is utilized for cell 1. In some embodiments, during the first time duration corresponding to 905*a* and 905*b*, a control signaling is conveyed to indicate UEs of the slice-specific time-frequency allocation to support the two slices in the two BW 910 and 950.

Figure 10:
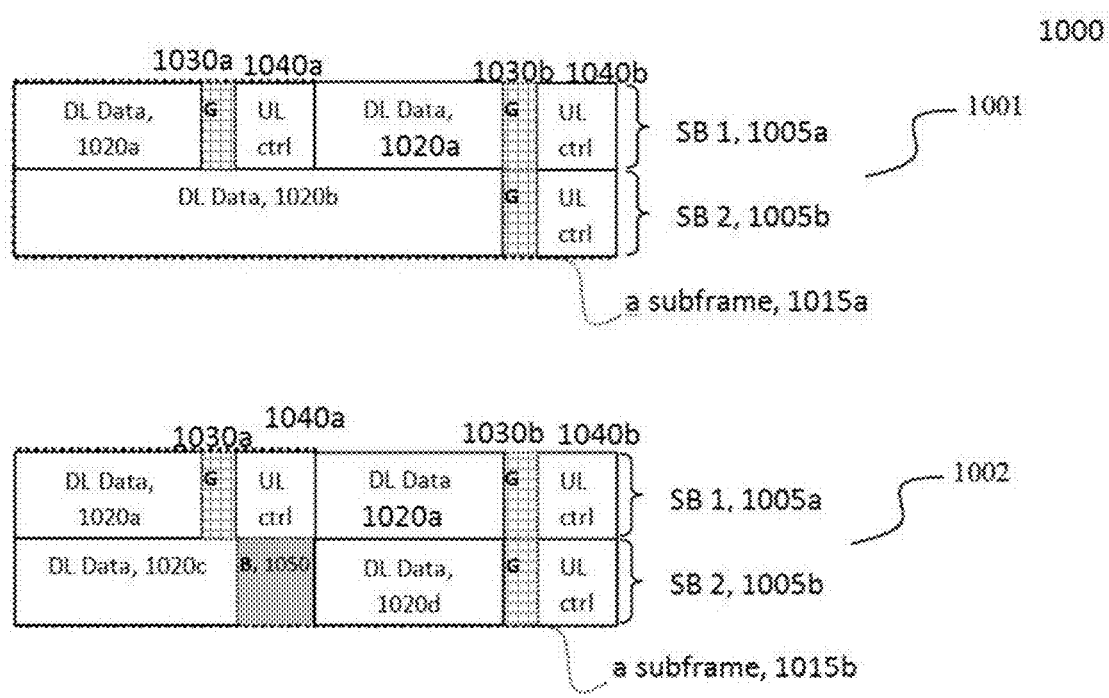
FIG. 10 illustrates a self-contained frame structure according to embodiments of the present disclosure.

FIG. 10 1000 illustrates a self-contained frame structure according to embodiments of the present disclosure. An embodiment of the self-contained frame structure shown in FIG. 10 1000 is for illustration only. One or more of the components illustrated in FIG. 10 1000 can be implemented in specialized circuitry configured to perform the noted functions or one or more of the components can be implemented by one or more processors executing instructions to perform the noted functions. Other embodiments are used without departing from the scope of the present disclosure.

As shown in FIG. 10 1000, self-contained frame structure comprises a plurality of subframes 1001, 1002. Furthermore, the subframes 1001 and 1002 comprise a plurality of subframes 1015*a*, 1015*b*, m an SB 1 1005*a*, an SB 2 1005*b*, a UL ctrl 1040*b*, a plurality of DL data 1020*a*, 1020*b*, a guard band (G) 1030*a*, 1030*b*.

In some embodiments, SB1, 1005*a* is configured for a first slice (slice 1); and SB2, 1005*b* is configured for a second slice (slice 2). For SB1, 1005*a*, a subframe 1005 comprises DL data 1020*a*, the guard interval (1030*a*), and the UL control (1040*a*). For SB2, in one alternative embodiment, the subframe 1005 comprises the DL data 1020*b*, the guard interval (1030*b*) and the UL control (1040*b*). For SB2, in one alternative embodiment, a subframe 1015*b* comprises DL data 1020*c* and 1020*d*, a blank interval (1050), a guard interval (1030*b*) and UL control (1040*b*). In some embodiments, the DL data duration 1020*a*, 1020*b* may further comprise DL PHY control duration 620*a*/660*a* followed by DL PHY data duration 630*a*/670*a*. Guard interval 1030*a*, 1030*b* are provided to give the UE sufficient time to decode DL data to generate A/N, and also to apply timing advance to transmit the A/N carried in the UL control interval (1040*a*, 1040*b*).

In some embodiments as illustrated in 1001 of FIG. 10 1000, the lengths of the DL data duration 1020*a*, 1020*b* can be configured slice-specifically. In particular, depending on the configured applications (and slices), the lengths of the DL data duration 1020*a*, 1020*b* can be differently configured.

In one such embodiment, a UE is allocated with two slices, the eMBB slice 560*a* and the URLL slice 540*a*. The PHY signals corresponding to the eMBB slice 560*a* are Tx/Rx'ed in the SB2, 1005*b* and the PHY signals corresponding to the URLL slice 540*a* is Tx/Rx'ed in SB1, 1005*a*. For SB1 1005*a* for the URLL slice 540*a*, a shorter DL data duration is configured, and for SB2 1005*b* for the eMBB slice 560*a*, a longer DL data duration is configured. With the longer DL data duration, spectral efficiency for the eMBB slice 560*a* is improved thanks to less overhead ratio. With the shorter DL data duration, latency for the URLL slice 540*a* is reduced.

For eNB operation, multiplexing of UL reception and DL transmission in the same time resources should be avoided, as it introduces large interference to UL reception at the LNA (low-noise amplifier), caused from the high-power transmitted DL signal, which will make UL decoding practically infeasible. The blank interval 1050 illustrated in 1002 is useful to prevent this situation from happening. Without the blank interval 1050, the UL control 1040*a* and DL data 1020*b* collide in time, which creates the referred issue.

In some embodiments, eNB configures its controller such that the blank interval 1050 is aligned with the UL control interval 1040*a*, as illustrated in FIG. 10 1000.

In some embodiments, the location of the blank interval 1050 is indicated to a serving UE receiving the DL data on SB2 1005*b* in a control signaling. In this case, the UE is aware of the blank interval 1050, and the UE shall assume that the DL modulation symbols are mapped onto only those DL data regions of 1020*c* and 1020*d*. In other words, the UE should apply rate matching around the blank interval 1050 for the DL data reception.

In some embodiments, the location of blank interval 1050 is predefined or configured by higher layer for a subframe, but the presence of the blank interval is indicated in a control signaling. The control signaling that indicates the location or the presence of the blank interval can be delivered in a dynamic control channel that can be transmitted every subframe 1015*b*. The dynamic control channel can be a dedicated control channel that signals DL assignment to the UE, or a common control channel for a group of or all serving UEs.

In some alternative embodiments, eNB applies a lower-rate channel coding to cope with the data puncturing due to the blank interval. In this case the UE is NOT aware of the blank interval 1050, and the UE assumes that the DL modulation symbols are mapped onto DL data region of 1020b. This method is applicable when RE mapping methods illustrated in 1300 and 1500 are used.

Figure 11A:
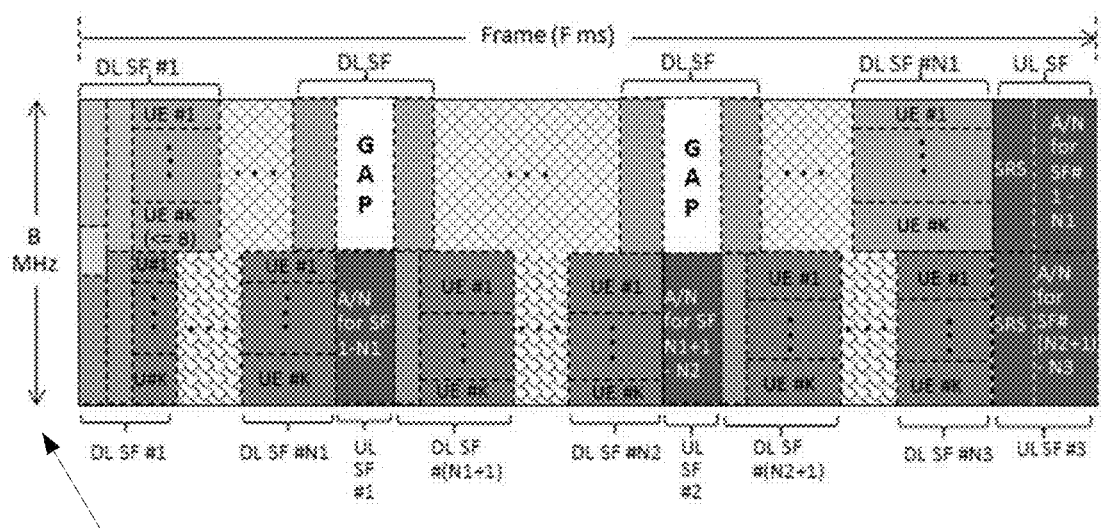
FIG. 11A illustrates a self-contained frame structure with 2 slices according to embodiments of the present disclosure.

FIG. 11A 1100A illustrates a self-contained frame structure with 2 slices according to embodiments of the present disclosure. An embodiment of the self-contained frame structure with 2 slices shown in FIG. 11A 1100A is for illustration only. One or more of the components illustrated in FIG. 11A 1100A can be implemented in specialized circuitry configured to perform the noted functions or one or more of the components can be implemented by one or more processors executing instructions to perform the noted functions. Other embodiments are used without departing from the scope of the present disclosure.

As shown in FIG. 11A 1100A, the self-contained frame structure with 2 slices 1100A comprises a frame 1105A and bandwidth (B) MHz 1110A. In FIG. 11A 1100A, the X (horizontal) axis represents time, whereas the Y (vertical) axis represents frequency. "SF" refers to a sub-frame within a frame; "DL" represents a downlink transmission (eNodeB to UE), "UL" refers to an uplink transmission (UE to eNodeB), "SRS" refers to an uplink pilot sequence transmitted by the UE, "A/N" refers to the ack-nack feedback from a UE regarding the reception success or failure of a downlink packet transmitted on a downlink subframe (SF), "PDCCH" refers to a control channel, "PDSCH" refers to a data channel, "CRS" refers to a set of pilot reference samples known to all UEs used to demodulate the control channel, "UERS" refers to a set of pilot reference samples used to demodulate a UE specific PDSCH.

In some embodiments, time gaps between DL and UL SFs, UL and DL SFs, or between a DL SF and the following DL SF are implemented.

As illustrated in FIG. 11A 1100A, an overall bandwidth of B MHz is allocated among K UEs such that each UE can be allocated up-to 2 service slices. It is to be understood that 2 services slices are exemplary. PDCCH0 is the common control channel that is interpreted by all UEs; in an embodiment, it may indicate the number of slices and the slice boundaries. The location of PDCCH0 would be known to all UEs. If the contents of PDCCH0 indicate the presence of 2 slices, as in this example, the locations of the slice-specific control channels PDCCH1 (for slice #1) and PDCCH2 (for slice #2) would be known to the UEs; PDCCH1 and PDCCH2 are located inside the resource allocation corresponding to the respective slice. The common reference signal (CRS) pilots are used to demodulate the PDCCH0, PDCCH1 and PDCCH2.

In some embodiments, a frame of Slice 1 contains the PDCCH1 region followed by N1 DL SFs, followed by a single UL SF containing the SRS as well as the ack-nack feedback for the packets transmitted in the DL portion of the frame. In another embodiment of this invention, the a UL SF containing the SRS may be present following a DL SF containing only PDCCH1, or following some other DL SF other than DL SF #N1. PDCCH1 indicates the DL resources allocated to a set of UEs within Slice1 for the entirety of the frame. All the UEs allocated DL resources in the frame send back ack-nack feedback in the UL SF at the end of the frame. A set of UEs, which may be larger than the set of UEs allocated resources in the frame, transmits the SRS either in the UL SF at the end of the frame or another UL SF in the frame. In some embodiments, the SRS transmissions occur before the A/N transmissions.

The slice 2 is divided in time into a set of SFs beginning with a DL SF beginning with a slice control channel PDCCH2 and terminated by a UL SF. For each set of such SFs, the control channel PDCCH2 indicates the DL SFs allocated to a set of UEs. These set of UEs transmit ack-nack feedback in the UL SF at the end of that set of SFs. A set of UEs, which may be larger than the set of UEs allocated resources in the frame, transmits the SRS either in the UL SF at the end of the frame or another UL SF in the frame. In one embodiment, the SRS transmissions occur before the A/N transmissions.

Figure 11B:
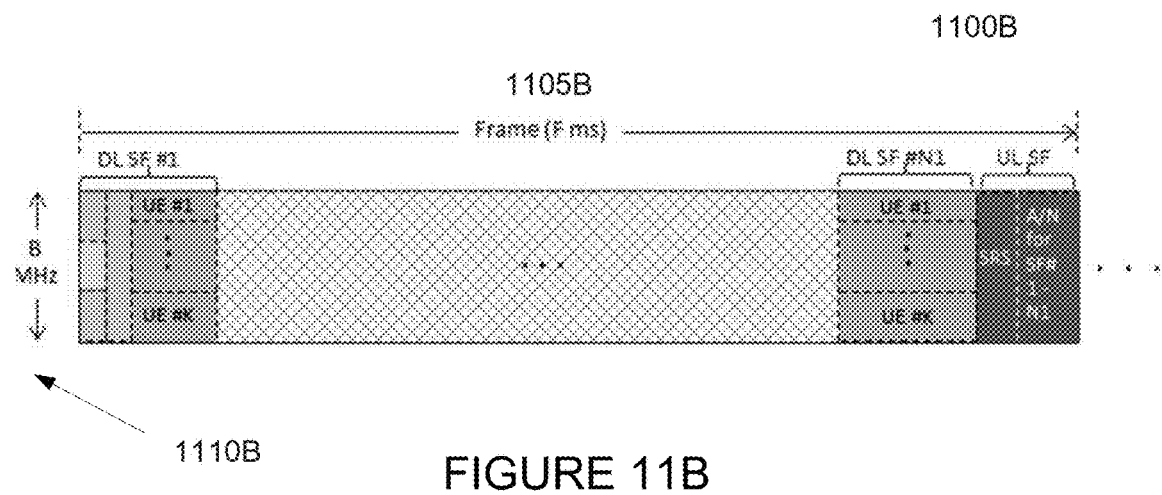
FIG. 11B illustrates a self-contained frame structure with a single slice according to embodiments of the present disclosure.

FIG. 11B 1100B illustrates a self-contained frame structure with a single slice according to embodiments of the present disclosure. An embodiment of the self-contained frame structure with a single slice shown in FIG. 11B 1100B is for illustration only. One or more of the components illustrated in FIG. 11B 1100B can be implemented in specialized circuitry configured to perform the noted functions or one or more of the components can be implemented by one or more processors executing instructions to perform the noted functions. Other embodiments are used without departing from the scope of the present disclosure. As shown in FIG. 11B 1100B, self-contained frame structure with a single slice comprises a frame 1105B and a bandwidth (B) MHz 1110B.

Figure 11C:
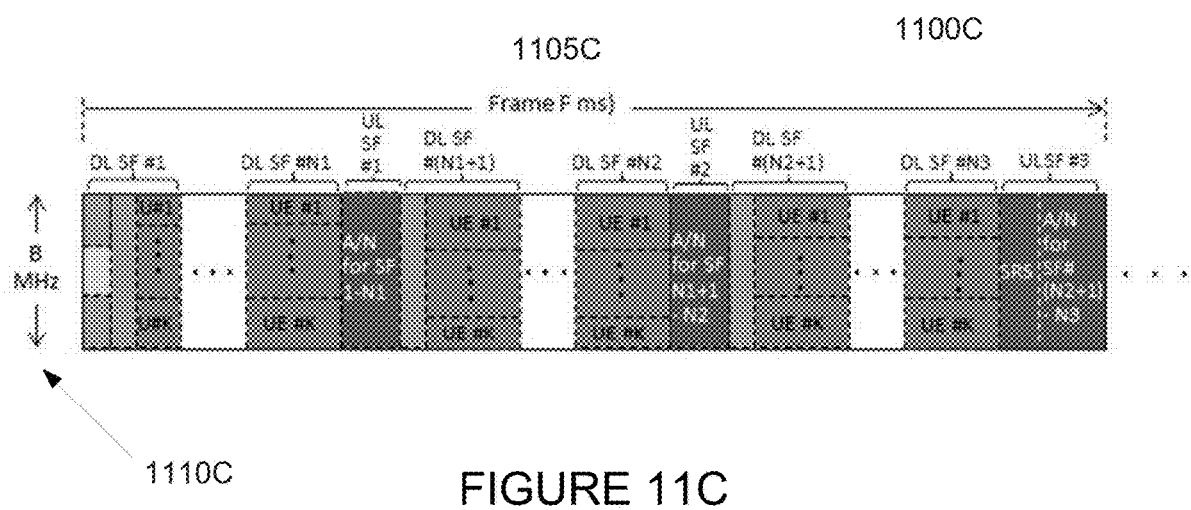
FIG. 11C illustrates another self-contained frame structure with 2 slices according to embodiments of the present disclosure.

FIG. 11C 1100C illustrates another self-contained frame structure with 2 slices according to embodiments of the present disclosure. An embodiment of the self-contained frame structure with 2 slices shown in FIG. 11C 1100C is for illustration only. One or more of the components illustrated in FIG. 11C 1100C can be implemented in specialized circuitry configured to perform the noted functions or one or more of the components can be implemented by one or more processors executing instructions to perform the noted functions. Other embodiments are used without departing from the scope of the present disclosure. As shown in FIG. 11C 1100C, self-contained frame structure with a single slice 1100C comprises a frame 1105C and a bandwidth (B) MHz 1110C. In some embodiments, frame structures with only Slice 1 and Slice2 operation are shown in FIG. 11B 1100B and FIG. 11C 1100C.

Figure 12A:
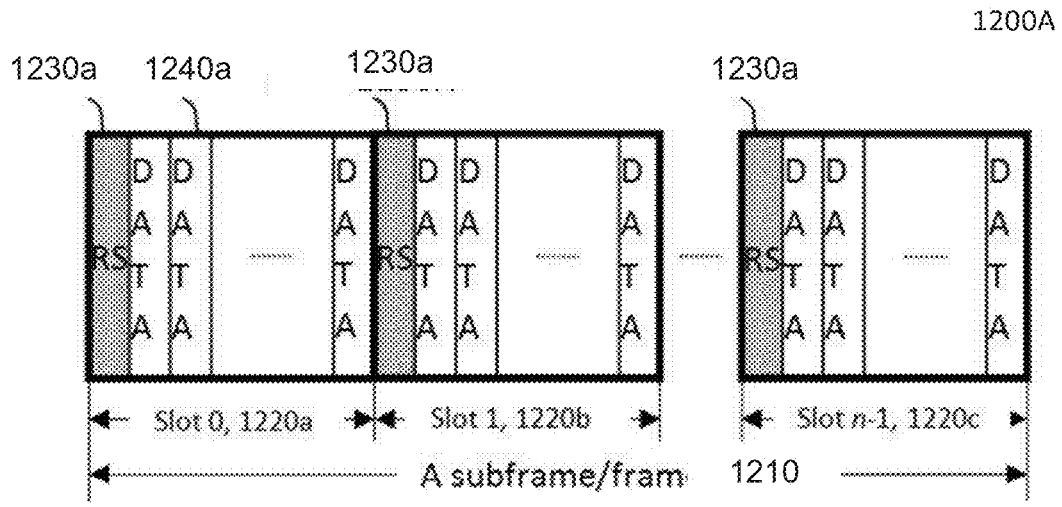
FIG. 12A illustrates a frame/subframe/TTI composition according to embodiments of the present disclosure.

FIG. 12A 1200A illustrates a frame/subframe/TTI composition according to embodiments of the present disclosure. An embodiment of the frame/subframe/TTI composition shown in FIG. 12A 1200A is for illustration only. One or more of the components illustrated in FIG. 12A 1200A can be implemented in specialized circuitry configured to perform the noted functions or one or more of the components can be implemented by one or more processors executing instructions to perform the noted functions. Other embodiments are used without departing from the scope of the present disclosure. As shown in FIG. 12A 1200A, the frame/subframe/TTI composition comprises a plurality of slots (slot 0, slot 1, slot n−1) 1220a, 1220b, 1220c, a plurality of RSs 1230a, and a plurality of data 1240a.

In some embodiments, a subframe or a frame or a TTI 1200A (corresponding to DL data region, 1020a, 1020b) comprises an n number of time slots (1220a, 1220b, 1220c). Each time slot comprises a number of reference signal OFDM (RS OFDM) symbols 1230a followed by a number of data OFDM symbols 1240a. This particular allocation method can be beneficial for UE to get channel estimates before the data demodulation.

In some embodiments, the UE may assume that a same precoder is applied to the RS 1230a across the entire subframe 1210 for channel estimation purpose. In these embodiments, the UE can interpolate channel estimates across the time slots to get better-quality channel estimates. In some embodiments, the UE may assume that precoders are applied to the RSa 1230a per time slot 1220a, 1220b, 1220c. In such embodiments, the UE may not interpolate channel estimates across the time slots to get better-quality channel estimates.

In some embodiments, whether or not the UE may assume the same precoder is applied across the entire subframe 1210 can be slice-specific; in one such embodiment, this information can be conveyed by a control signaling. In one such embodiment, the control signaling is dynamically transmitted per subframe, and the UE assumption changes on subframe basis (based on network scheduling decision).

In some embodiments, whether or not the UE may assume the same precoder is applied across the entire subframe 1210 for a slice is determined dependent upon subframe duration and/or frequency location of the slice; in one such embodiment, this information can be conveyed by a control signaling.

Figure 12B:
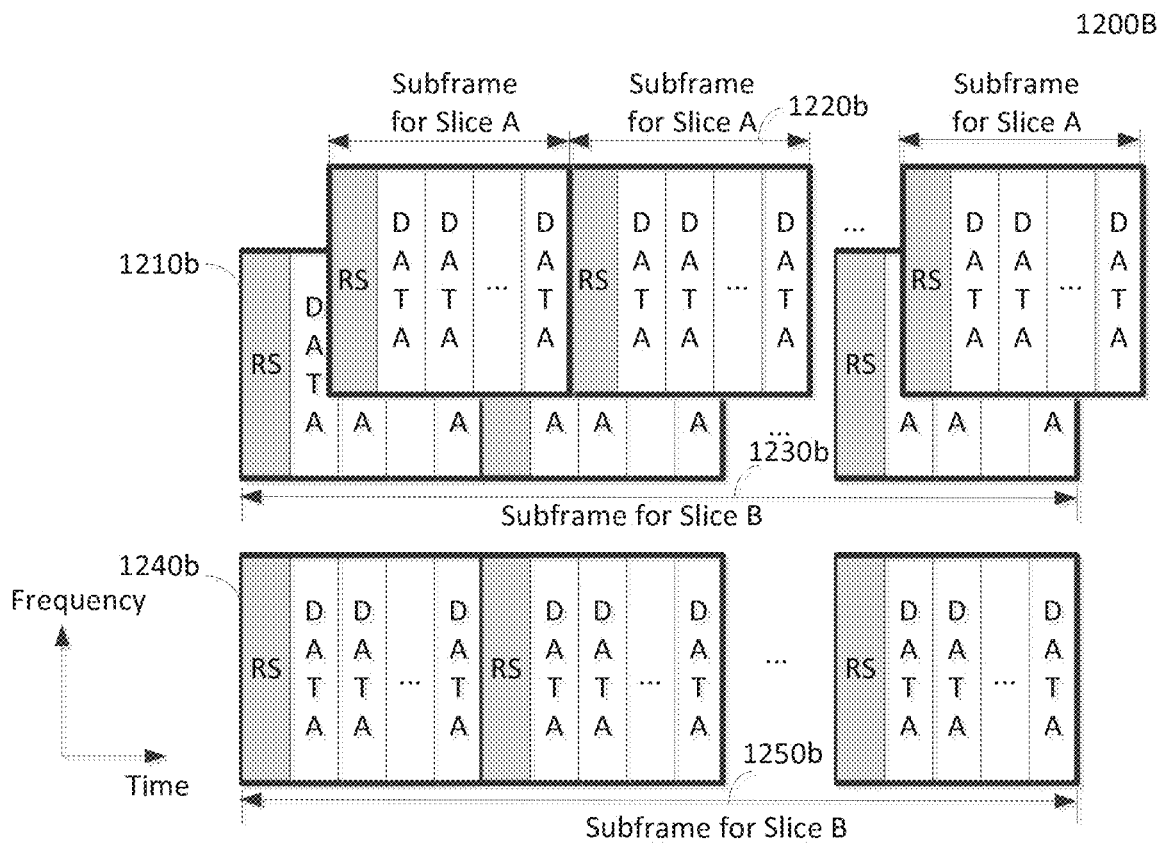
FIG. 12B illustrates another frame/subframe/TTI composition according to embodiments of the present disclosure.

FIG. 12B 1200B illustrates another frame/subframe/TTI composition according to embodiments of the present disclosure. An embodiment of the frame/subframe/TTI composition shown in FIG. 12B 1200B is for illustration only. One or more of the components illustrated in FIG. 12B 1200B can be implemented in specialized circuitry configured to perform the noted functions or one or more of the components can be implemented by one or more processors executing instructions to perform the noted functions. Other embodiments are used without departing from the scope of the present disclosure. As shown in FIG. 12B 1200B, frame/subframe/TTI composition comprises a frequency locations 1210b, 1240b (e.g., frequency subband, subband), a subframe for slice A 1220b, a plurality of subframe for slice Bs 1230b, 1250b (entire subframe).

In some embodiments, slice A is configured with a subframe duration and the frequency location 1210b; whereas slice B is configured with a subframe duration 1230b and the frequency locations 1210b and 1240b. Slice A and slice B are spatially multiplexed on the frequency subband 1210b; whereas only slice B is operating on the frequency subband 1240b. In one such embodiment, when a UE that is configured to receive on slice A on the subband 1210b on which the two slices are spatially multiplexed, the UE assume the same precoder is applied across the entire subframe 1220b (e.g., time slot).

In one such embodiment, when a UE is configured to receive on slice B on the subband 1210b on which the two slices are spatially multiplexed, the UE shall not assume the same precoder is applied across the entire subframe 1230b; instead, the UE may assume the same precoder is applied across the time duration corresponding to subframe duration of slice A. In such a case, the subframe duration of slice A can be equivalent to a slot duration. This per-slot precoder adaptation for slice B can help adapt certain classes of MU-MIMO precoders, e.g., SLNR or ZF precoders.

In one such embodiment, when a UE is configured to receive on slice B on the subband 1240b (e.g., frequency location) on which only one slice is present, the UE may assume the same precoder is applied across the entire subframe 1250b. In such embodiments, a UE configured with slice B is informed the precoding granularity assumption per subband for demodulation, wherein the assumption is either per subband or per subframe; and a UE configured with slice A is informed to apply the precoding granularity assumption of per-subframe precoding for demodulation.

In some embodiments, for a slice corresponding to an eMMB or with a large subframe duration, the UE may not assume the same precoder is applied across the entire subframe/TTI; whereas for a slice corresponding to URLL or with a short subframe/TTI duration, the UE may assume the same precoder is applied across the entire subframe/TTI 1210 or 1005a, 1005b. This is because the network may perform multi-user precoding on slices of different subframe/TTI duration over the same time-frequency resources.

In some embodiments, whether or not the UE may assume the same precoder is applied in an entire subframe/TTI 1210 is signaled by the network (regardless of the slice configured). The signaling can be provided by higher layer signaling or by dynamic control signaling. With dynamic control signaling per subframe/TTI, the UE assumption can change on subframe/TTI basis (based on network scheduling decision).

The time-domain precoding granularity can be separately configured for the signal DMRS ports and the interference DMRS ports. The DCI to schedule a PDSCH may include explicit information of the signal DMRS ports (port numbers), on which the UE needs to demodulate the PDSCH. The interference DMRS ports (DMRS ports other than configured for the signal DMRS ports) may be implicitly or explicitly obtained by the UE. The UE may get further indicated by a field in the DCI (or an information element in an RRC signaling or on a mediumaccesscontrol layer control element (MAC CE)) what to assume for the precoding granularity in the time domain, for the signal and the interference DMRS ports.

Table 1 illustrates an example construction of the indication field (or the information element) to indicate the precoding granularity for the signal and the interference demodulation reference signal (DMRS) ports. When the state is '0' the UE should assume that the precoding granularity is per time slot for both signal and interference DMRS ports. When the state is '1', '2' and '3' the precoding granularity is interpreted according to the state of the field according to the entries of the table.

TABLE 1

| Precoding granularity | State of the field (or the information element) | | | |
|---|---|---|---|---|
| State of the field in the DCI | 0 | 1 | 2 | 3 |
| For the signal DMRS ports | Per time slot | Per time slot | Per subframe/TTI | Per subframe/TTI |
| For the interference DMRS ports | Per time slot | Per subframe/TTI | Per time slot | Per subframe/TTI |

Table 2 illustrates another example construction of the indication field (or the information element) to indicate the precoding granularity for the signal and the interference DMRS ports. When the state is '0' the UE should assume that the precoding granularity is per subframe for both signal and interference DMRS ports. When the state is '1', '2' and '3' the precoding granularity is interpreted according to the state of the field according to the entries of the table. When precoding granularity is "across a number of subframes (e.g., slots)," the UE should also be indicated the identity of the subframes/slots for which the UE may assume the same precoding. In one method, those subframes/slots correspond to S consecutive subframes/slots for which PDSCH(s) are scheduled for the UE by the DCI; the integer S=1, 2, 3, . . . can be configured by RRC or dynamically signaled in the DCI. In another method, time domain precoding granularity is configured by subframe/slot period P and subframe/ slot offset 0. UE may assume that a same precoding is applied across scheduled PDSCHs within subframes/slots {Pk+0+n} wherein n=0, 1, . . . , P−1 for a given integer k.

TABLE 2

| Precoding granularity | State of the field (or the information element) | | | |
|---|---|---|---|---|
| State of the field in the DCI | 0 | 1 | 2 | 3 |
| For the signal DMRS ports | Per subframe/slot | Per subframe/slot | Across a number of subframes/slots | Across a number of subframes/slots |
| For the interference DMRS ports | Per subframe/slot | Across a number of subframes/slot | Per subframe/slot | Across a number of subframes/slots |

In some embodiments, a number of transport blocks (TBs) are encoded and mapped to the data region of a subframe/frame 1200. Each transport block can be partitioned into a number of code blocks, which are separately encoded by a channel encoder (e.g., 3GPP Turbo encoder, LDPC encoder, Reed-Muler encoder, convolutional encoder, etc.).

In some embodiments, one (SIMO) or two (MIMO) transport/code blocks are encoded and mapped in each time slot of a subframe/TTI 1210. In this case, when a subframe/TTI comprises n time slots, n or 2n transport/code blocks are mapped in the subframe/TTI. In one embodiment, A/N is generated per transport/code block, and the UE is configured to feedback n or 2n A/N bits after decoding the transport/code blocks. In an alternative embodiment, one A/N is generated for the all transport/code blocks, taking logical AND operation across the decoding results of all the transport/code blocks.

In some embodiments, an integer number of code blocks are mapped per time slot, but the total number of transport blocks is one (e.g., in case of SIMO transmissions) or two (e.g., in case of MIMO transmissions) in each subframe/TTI 1210.

Figure 13:
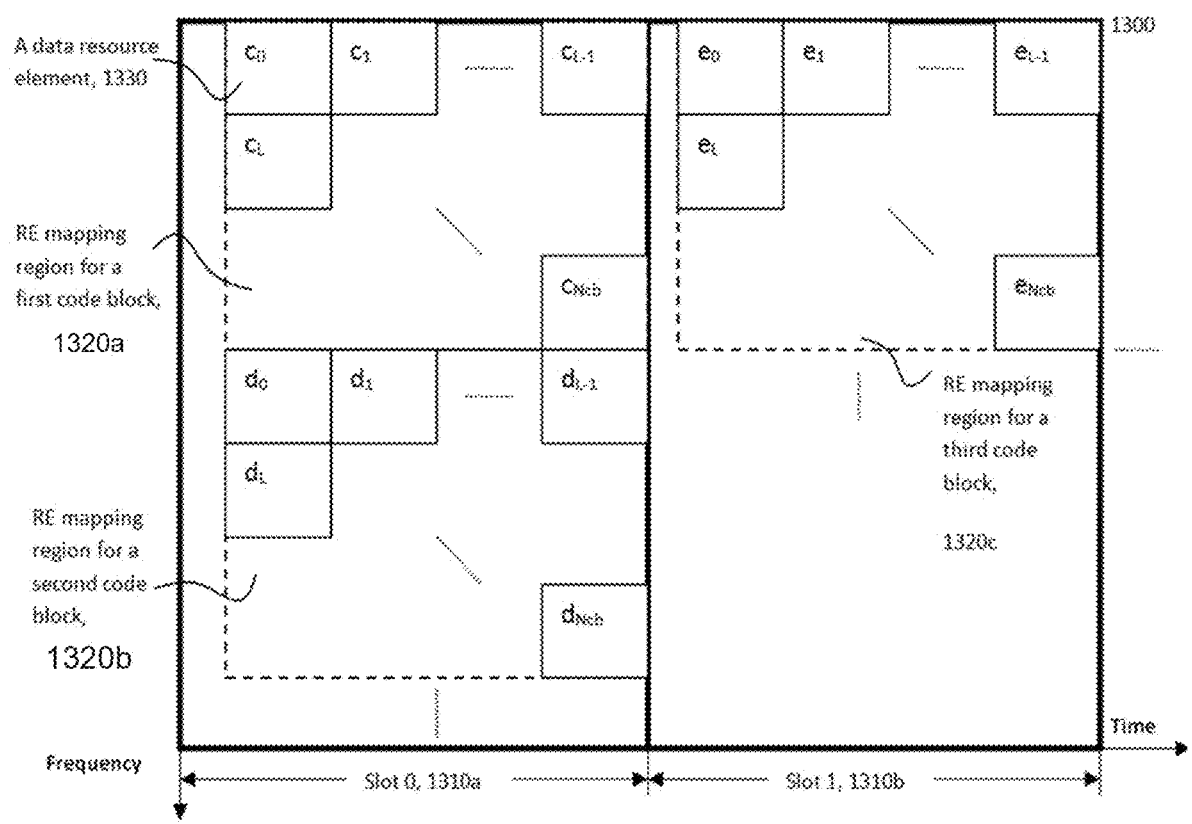
FIG. 13 illustrates a resource element mapping of data modulation symbols according to embodiments of the present disclosure.

FIG. 13 1300 illustrates a resource element mapping of data modulation symbols according to embodiments of the present disclosure. An embodiment of the resource element mapping of data modulation symbols shown in FIG. 13 1300 is for illustration only. One or more of the components illustrated in FIG. 13 1300 can be implemented in specialized circuitry configured to perform the noted functions or one or more of the components can be implemented by one or more processors executing instructions to perform the noted functions. Other embodiments are used without departing from the scope of the present disclosure.

As shown in FIG. 13 1300, resource element mapping of data modulation symbols comprises a slot 0 1310a, a slot 1, 1310b, a plurality of RE mapping regions 1320a, 1320b, 1320c, and a data resource elements 1330.

In some embodiments, a transport block comprises a number of code blocks. In some embodiments, a time slot comprises L OFDM symbols; and a subframe comprises T OFDM symbols. In some embodiments, a UE is configured to receive a transport block comprising a number of code blocks in a subframe/TTI on K subcarriers.

In some embodiments, modulation symbols corresponding to a first code block (CB) of the transport block are sequentially mapped to data resource elements 1330 corresponding to OFDM symbols 0, . . . , L−1 comprising a time slot (1310a, 1310b) on subcarrier 0, and then on subcarrier 1, and so forth. As illustrated in 1320a, wherein c0, c1, . . . , cNCB are symbols for a modulation symbol stream of the first code block. Once the modulation symbols corresponding to the first code block are completely mapped, modulation symbols corresponding to a second code block of the transport block are sequentially mapped in the next available resource, according to this "time-first mapping". This is illustrated in 1320b, wherein d0, d1, . . . , dNCB are symbols for a modulation symbol stream of the second code block. Once slot 0 1310a is filled with modulation symbols according to this manner, slot 1 1310b is mapped with modulation symbols according to this time first mapping. 1320c illustrates the mapping of a modulation symbol stream {e0, e1, . . . , eNCB} of a third code block.

In some embodiment, a UE can still robustly decode transport block even if an OFDM symbol is erased. This mapping method can be useful for an eMBB to cope with occasional OFDM symbol-level puncturing of an eMBB transport blocks e.g., for multiplexing URLL with the eMBB, especially when the eMBB UEs do not require very stringent latency requirement and have sufficient buffer.

Figure 14:
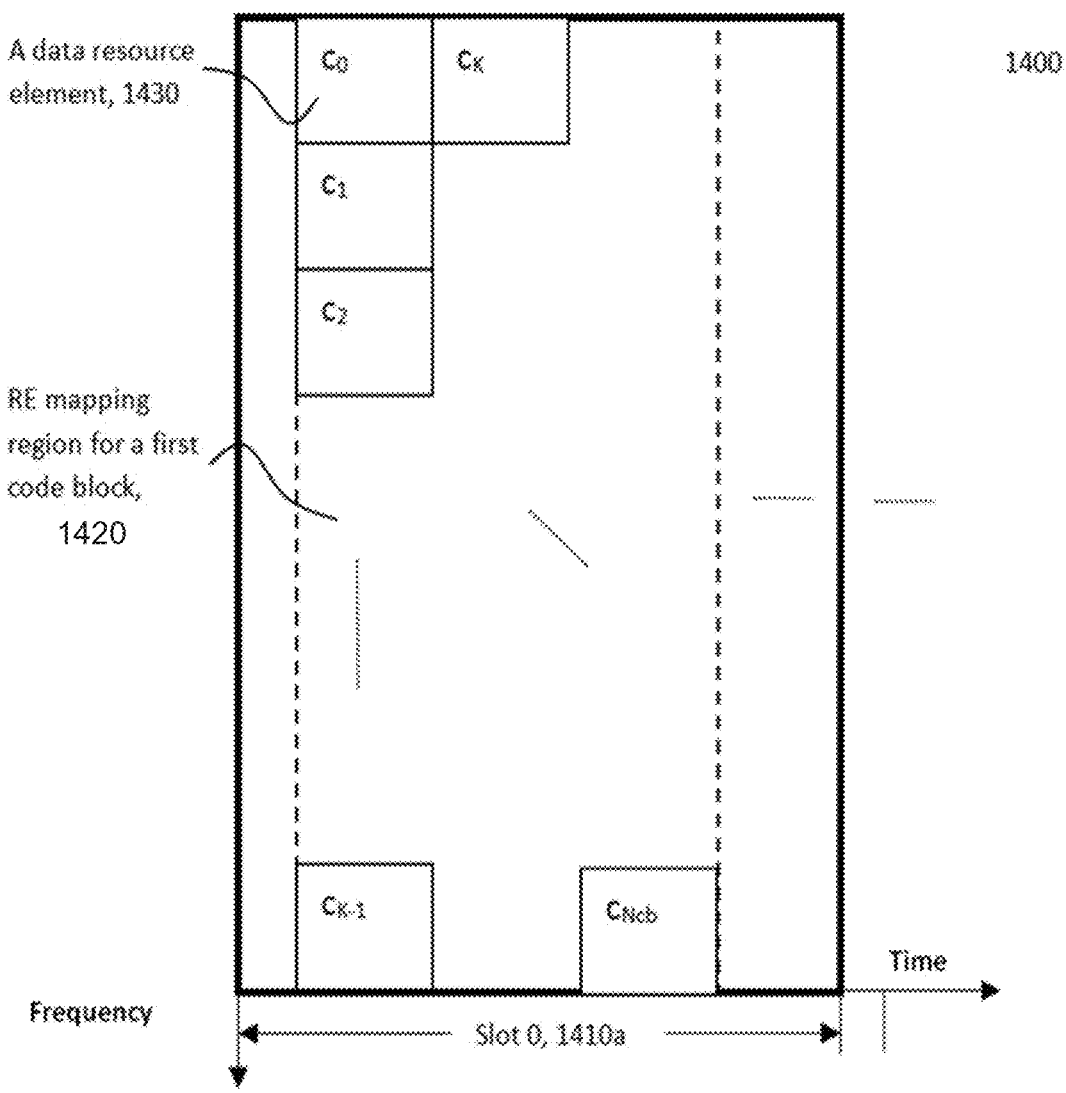
FIG. 14 illustrates another resource element mapping of data modulation symbols according to embodiments of the present disclosure.

FIG. 14 1400 illustrates another resource element mapping of data modulation symbols according to embodiments of the present disclosure. An embodiment of resource element mapping of data modulation symbols shown in FIG. 14 1400 is for illustration only. One or more of the components illustrated in FIG. 14 1400 can be implemented in specialized circuitry configured to perform the noted functions or one or more of the components can be implemented by one or more processors executing instructions to perform the noted functions. Other embodiments are used without departing from the scope of the present disclosure.

As shown in FIG. 14 1400, the resource element mapping of data modulation symbols comprises a slot 0 1410a, an RE mapping region 1420, and a data resource element 1430.

In some embodiments, modulation symbols {c0, c1, . . . , cNCB} corresponding to a first code block are sequentially mapped to the REs 1430 corresponding to subcarriers 0, . . . , K−1 comprising an assigned BW on OFDM symbol 0, and then on OFDM symbol 2, and so forth. As illustrated in 1420. Once the modulation symbols corresponding to the first code block are completely mapped, modulation symbols corresponding to a second code block are sequentially mapped in the next available resource, according to this "frequency-first mapping" described here.

In some embodiments, a UE does not need to buffer much of received signals. The transport blocks are sequentially decoded in time, once decoding of a transport block is over the received signals corresponding to the transport block can be discarded. In such embodiments, a less decoding latency occurs, and hence more suitable for URLL types of applications are achieved.

Figure 15:
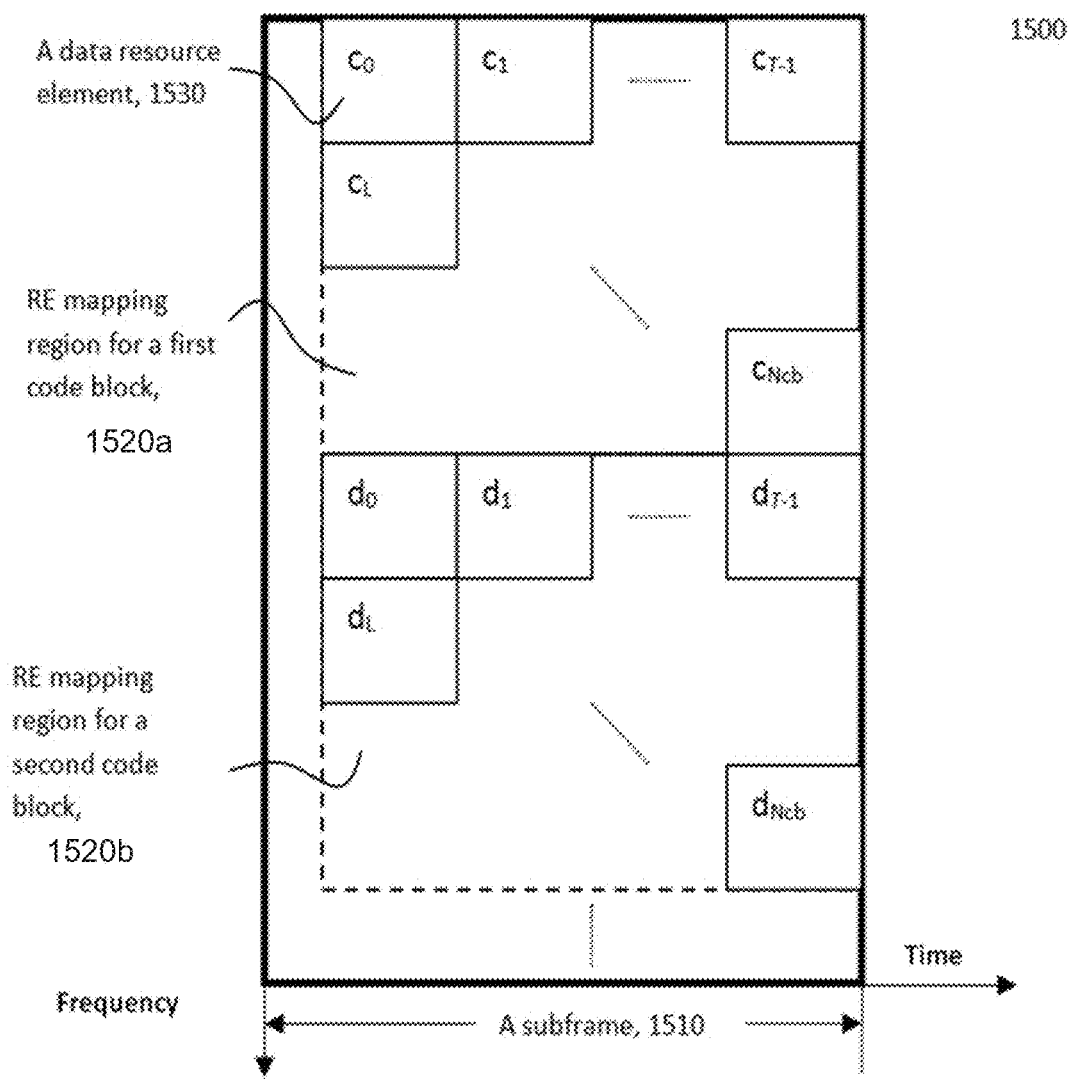
FIG. 15 illustrates yet another resource element mapping of data modulation symbols according to embodiments of the present disclosure.

FIG. 15 1500 illustrates yet another resource element mapping of data modulation symbols according to embodiments of the present disclosure. An embodiment of the resource element mapping of data modulation symbols 1500 shown in FIG. 15 1500 is for illustration only. One or more of the components illustrated in FIG. 15 1500 can be implemented in specialized circuitry configured to perform the noted functions or one or more of the components can be implemented by one or more processors executing instructions to perform the noted functions. Other embodiments are used without departing from the scope of the present disclosure.

As shown in FIG. 15 1500, the resource element mapping of data modulation symbols 1500 comprises a slot 0 1510a, a plurality of RE mapping regions 1520*a*, 1520*b*, and a data resource element 1530 (e.g., RE).

In some embodiments, modulation symbols {c0, c1, . . . , cNCB} corresponding to a first code block are sequentially mapped to REs 1530 corresponding to OFDM symbols 0, . . . , T−1 comprising a subframe (1510) on subcarrier 0, and then on subcarrier 1, and so forth. As illustrated in FIG. 15 1500, once the modulation symbols corresponding to the first code block are completely mapped, modulation symbols corresponding to a second code block are sequentially mapped in the next available resource, according to this "time-first mapping" described here. This is illustrated in 1520*b*.

In some embodiments, an RE mapping method is slice-specifically configured, wherein the control signaling conveying the RE mapping method is transmitted in the cell-based operation (or the anchor slice) region 810*a* or 810*b*. In one such embodiment, the eNB configures the time first mapping (either 1300 or 1500) for the eMBB slice 560*a*, and the frequency first mapping (e.g., FIG. 14 1400) for the URLL slice 540*a*.

It is noted that some PHY functions are bound to be slice-common, and some other PHY functions can be made slice-specific. In some embodiments, NW planning is slice-specific; that is, different set of serving cells/sites are configured/utilized for different slices. In some embodiments, a first UE configured with a first slice can Tx/Rx on PHY channels corresponding to a first set of serving cells/sites; and a second UE configured with a second slice can Tx/Rx on PHY channels corresponding to a second set of serving cells/sites. In such embodiments, a network comprises the network nodes 530*a*, 530*b*, 535*a* and 535*b* (e.g., eNBs). The first set of serving cells/sites for the first slice correspond to 530*a* and 530*b*; and the second set of serving cells/sites for the second slice correspond to 535*a* and 535*b*.

In some embodiments, a UE is configured to Tx/Rx on a single slice. In such embodiments, a slice-specific Tx/Rx occurs within the UE's configured serving cells. It is noted that the number of configured serving cells can be more than one if carrier aggregation is configured for the UE. In some embodiments, a UE is configured to Tx/Rx on multiple slices.

Figure 16:
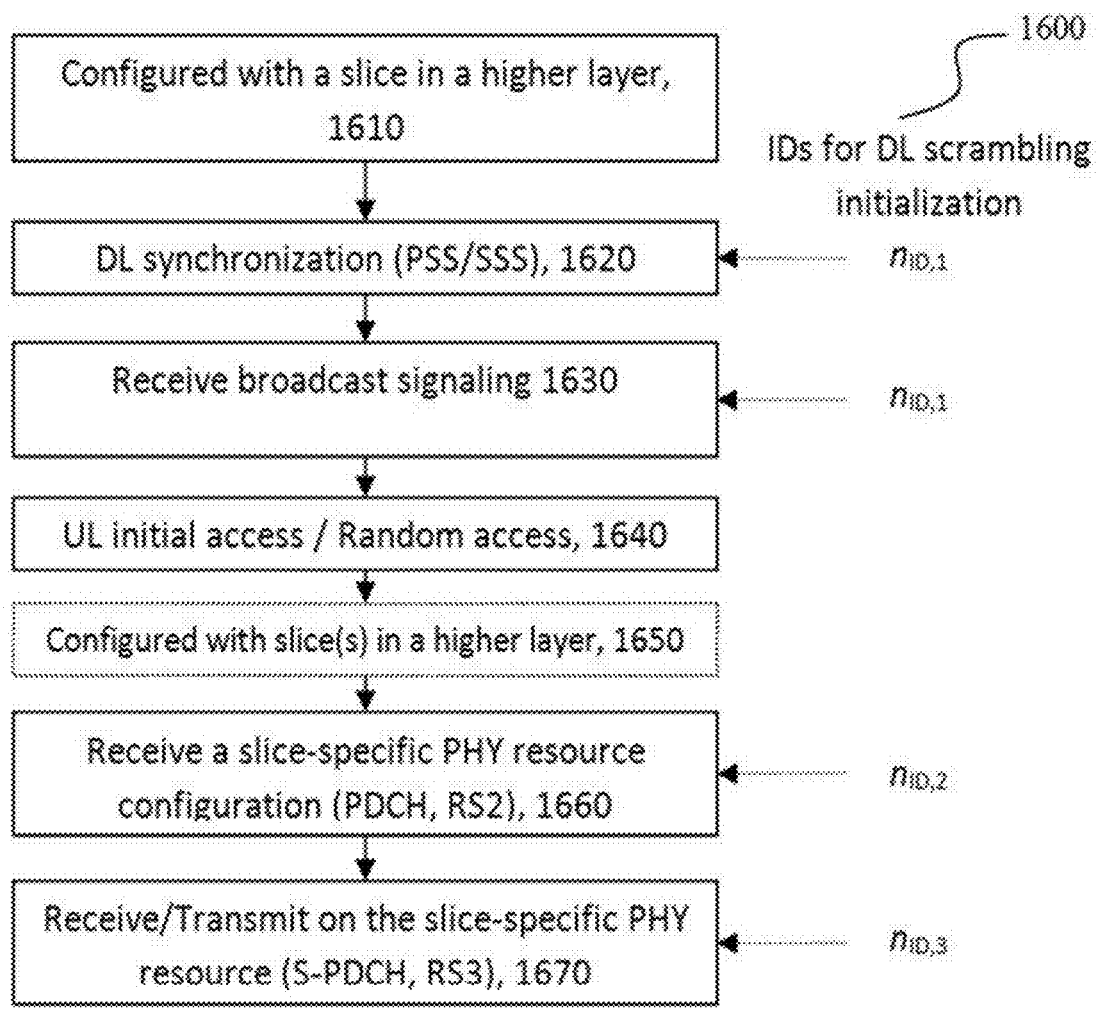
FIG. 16 illustrates a user equipment (UE) operation according to embodiments of the present disclosure.

FIG. 16 1600 illustrates a user equipment (UE) operation according to embodiments of the present disclosure, as may be performed by a UE. An embodiment of the UE operation shown in FIG. 16 1600 is for illustration only. One or more of the components illustrated in FIG. 16 1600 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is firstly configured with a slice in a higher layer at step 1610. In one such embodiment, the UE is configured with a "default" slice without network intervention (i.e., the UE is manufactured to camp on a "default" slice in a factory setting). In another such embodiment, a slice that has been configured by the NW in a previous communication is configured again as a "default" slice at step 1610.

In some embodiments, the default slice configuration is implicit at step 1610, in which case the UE is configured to camp on a cell-based operation duration/region 810*a*, 810*b*, 810*c*, 810*d*. Followed by the "default" slice configuration at step 1610, the UE is further configured to synchronize with a network node (or a set of quasi co-located network nodes) at step 1620. For this synchronization operation, the network provides synchronization signals (SS), which can be partitioned into primary SS (PSS) and secondary SS (SSS). The SS (or PSS/SSS) are scrambled with a scrambling sequence initialized with a scrambling identity, nID,1.

Followed by the synchronization operation at step 1620, the UE is further configured to receive broadcast signaling at step 1630. The broadcast signaling comprising master information block (MIB) is conveyed on primary broadcast channel (PBCH) whose demodulation is aided by a first reference signal (denoted by RS1). The broadcast signaling comprising system information blocks (SIBs) is scheduled and conveyed on physical downlink signals (PDCH), whose demodulation is also aided by a first reference signal, denoted by RS1. These PHY signals, PBCH, PDCH and RS1 are scrambled with their respective scrambling sequences initialized with nID,1.

In some embodiments, PDCH includes physical downlink control channels (PDCCH), physical downlink shared channels (PDSCH), and so on. Followed by the broadcast signaling operation at step 1630, the UE is further configured to perform UL initial access (or random access procedure) at step 1640. Followed by the UL initial access at step 1640, the UE can be further configured in a higher layer with slice(s) at step 1650 for subsequent operations. The higher layer signaling is UE-specific, and can be conveyed in the random access response (RAR). In some embodiments, the slice configuration at step 1650 is omitted, when the UE is configured to operate with the default slice configured at step 1610.

Followed by the slice configuration at step 1650 or the UL initial access at step 1640, the UE is further configured to receive slice-specific PHY resource configuration at step 1660 on PDCH, whose demodulation is aided by a second reference signal, RS2. These PHY signals, PDCH and RS2 are scrambled with their respective scrambling sequences initialized with a scrambling identity, nID,2.

Followed by the PHY resource configuration at step 1660, the UE is further configured to Tx/Rx on slice-specific PHY resources at step 1670 on S-PDCH (slice-specific PDCH), whose demodulation is aided by a third reference signal (RS3). These PHY signals, S-PDCH, and RS2 are scrambled with their respective scrambling sequences initialized with a scrambling identity, nID,3. In some embodiments, the broadcast signaling at step 1620 and the slice-specific PHY resource configuration at step 1660 are transmitted in a subband located on the center of the system BW, wherein the center subband also includes the DL synchronization signal at step 1620. A UE configured with a slice is configured to decode the slice-specific information including the slice-specific PHY time frequency resource during the steps of 1640 and 1660, and Tx/Rx in the configured slice-specific PHY time-frequency resource.

In some embodiments, all the 3 scrambling identities, i.e., nID,1, nID,2 and nID,3 are the same. In one such embodiment, the common scrambling ID corresponds to a physical cell ID. In some embodiments, nID,1 and nID,2 are the same, and are equal to a physical cell ID; and nID,3 is a slice-specific ID. In some embodiments, nID,1 is equal to a physical cell ID; and nID,2 and nID,3 are the same, and are equal to a slice-specific ID. In some embodiments, a UE is configured to blindly detect a physical cell ID (in one such embodiment, it is equal to nID,1), during the DL synchronization at step 1620.

In some embodiments, slice-specific ID(s) corresponding to the NW configured slice(s) is(are) indicated by the slice-specific PHY resource configuration at step 1660. In some embodiments, slice-specific ID(s) corresponding to the NW configured slice(s) is(are) indicated by the broadcast signaling at step 1630. In some embodiments, a slice-specific ID is a virtual cell ID, whose value is selected from a set of physical cell IDs. In some embodiments, RS1 and RS2 are a first type of RS, and RS3 is a second type of RS. In some embodiments, RS1, RS2 and RS3 are of a same type of RS.

In some embodiments (slice-common access), each UE configured with a slice is further configured by RRC (or higher-layer signaling) to identify time/frequency resources and numerology parameters of the slice-specific PHY channels corresponding to the configured slice. In such embodiments, the higher-layer signaling is conveyed in slice-common PHY channels 810*a*, 810*b*, 810*c*, and 810*d*. In the initial access, the UE is configured to utilize a slice-common synchronization procedure and system-information acquisition procedure in the slice-common PHY channels at step 1620. In such embodiments, the slice-common synchronization procedure at step 1620 can be serving-cell based procedure, in which case the sync channel sequences are scrambled with a scrambling sequence initialized with a physical cell ID; and system-information acquisition procedure using broadcasting signal at step 1630 is according to cell-specific reference signals and primary broadcast signals (whose scrambling initialization is dependent upon the physical cell ID).

In some alternative embodiments (slice-specific access), each UE configured with a slice is further configured to firstly detect slice-specific "signature" signals to identify the time/frequency resources and numerology parameters of one slice-specific PHY channel. In the initial access, the UE is configured to utilize a slice-specific synchronization procedure and system-information acquisition procedure in the slice-specific PHY channel. Once the UE identifies time/frequency resources and numerology parameters of the one slice-specific PHY channel, the UE is further configured to decode slice-specific broadcast information, which contains information to identify time/frequency resources and numerology parameters of other slice-specific PHY channels.

In some embodiments, a UE receives multiple services (slices) from a single TP (i.e., the eNB 530*a* or WiFi or small cell/femto/pico eNB 530*c*). In such embodiments, the UE uses common PHY signals for receiving the multiple services (slices). For example, signals provided for basic coverage and synchronization may be commonly used for receiving/transmitting data corresponding to the multiple slices by the UE (as a single network node provides the multiple services). Such signals may include synchronization signals, primary broadcast signals and corresponding reference signals (RS). Other RRC configurations and corresponding RS can be slice-specific. In such embodiments, a UE is configured with multiple "slices" that are conveyed in a single serving cell. Some parameters including master information block are commonly applicable to those multiple slices; other parameters can be configured UE-specifically per slice. It is noted that "slice" is a terminology introduced just for convenience to refer to such an entity; "slice" can be named differently, e.g., virtual cells, hyper cells, cells, etc.

Figure 17:
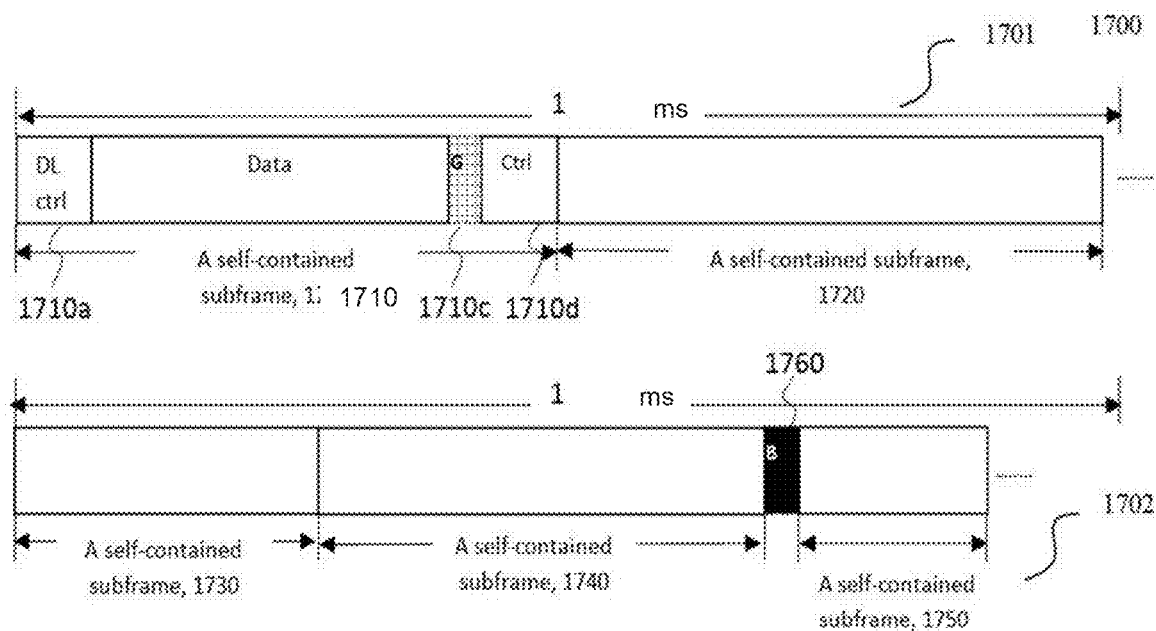
FIG. 17 illustrates a frame structure for a ultra reliable and low latency (URLL) slice according to embodiments of the present disclosure.

FIG. 17 1700 illustrates a frame structure for an ultra reliable and low latency (URLL) slice according to embodiments of the present disclosure. An embodiment of the frame structure for the URLL slice shown in FIG. 17 1700 is for illustration only. One or more of the components illustrated in FIG. 17 1700 can be implemented in specialized circuitry configured to perform the noted functions or one or more of the components can be implemented by one or more processors executing instructions to perform the noted functions. Other embodiments are used without departing from the scope of the present disclosure. As shown in FIG. 17 1700, the frame structure for the URLL slice comprises a plurality of subframes (e.g., subframe durations) 1701, 1702, a DL control 1710*a*, a self-contained subframe 1710, 1720, 1730, 1740, 1750, a guard band 1710*c*, and a control 1710*d*.

A latency requirement for the URLL slice 540*a* in PHY can be <1 msec. To meet this latency requirement, a self-contained subframe duration (including DL control, data and UL control) should not exceed 1 msec. Moreover, a UE or eNB may sometimes need to wait for a valid subframe boundary, and hence the subframe duration needs to be even far smaller than 1 msec.

In some embodiments, the subframe duration 1701 and 1702, on a URLL slice 540*a* is a constant less than or equal to 0.5 msec. Having this frame structure, maximum queuing delay of a UE's or eNB's small packet is 0.5 msec, and the data transmission can happen within the following subframe duration. Hence, the resulting PHY latency is less than or equal to 1 msec.

In some embodiments, the subframe durations 1730, 1740 and 1750, on a URLL slice 540*a* is a variable less than or equal to 0.5 msec, which may be dependent upon the data packet size conveyed in the subframes. In this frame structure, subframe boundary can be anywhere. When the system does not have any data transmission, there can also be blank durations, 1760.

In these embodiments, a self-contained subframe may comprise DL control 1710*a* that contains scheduling information for DL/UL data 1710*b*, DL/UL data 1710*b*, guard period 1710*c* and UL/DL control 1710*d* that may contain A/N for the DL/UL data 1710*b*.

Figure 18:
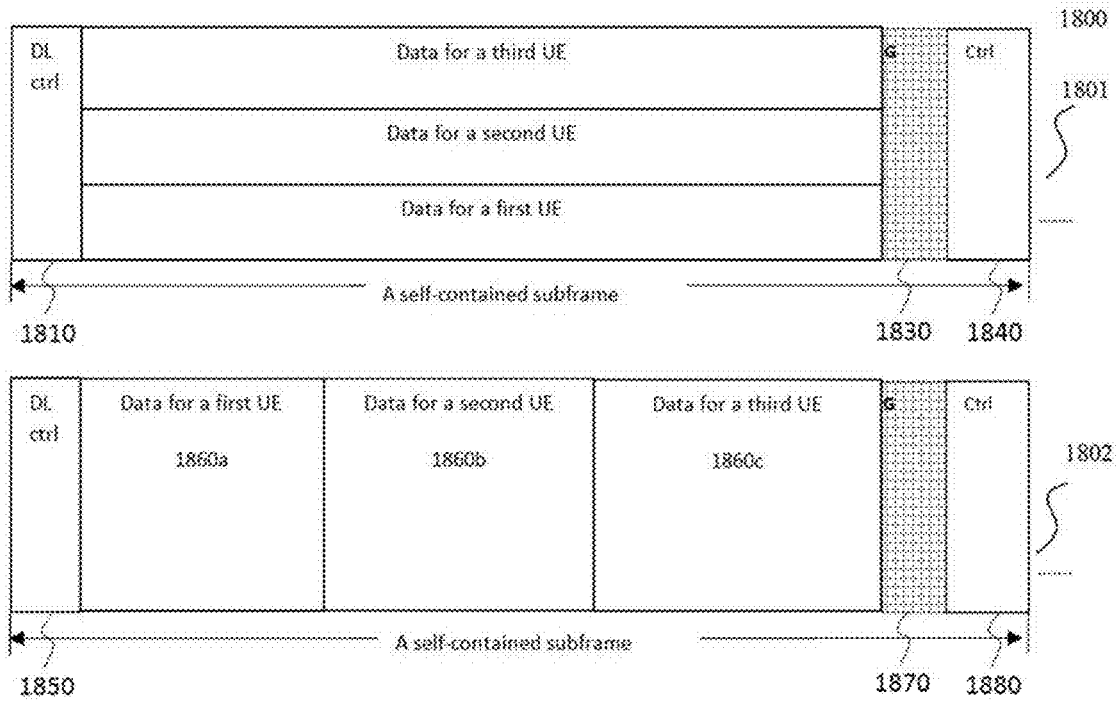
FIG. 18 illustrates a frame structure for an enhanced mobile broadband (eMBB) slice according to embodiments of the present disclosure.

FIG. 18 1800 illustrates a frame structure for an enhanced mobile broadband (eMBB) slice according to embodiments of the present disclosure. An embodiment of the frame structure for the eMBB slice 1800 shown in FIG. 18 1800 is for illustration only. One or more of the components illustrated in FIG. 18 1800 can be implemented in specialized circuitry configured to perform the noted functions or one or more of the components can be implemented by one or more processors executing instructions to perform the noted functions. Other embodiments are used without departing from the scope of the present disclosure. As shown in FIG. 18 1800, the frame structure for the eMBB slice comprises a plurality of subframes 1801, 1802, a DL control 1810, 1850, a guard band 1830, 1870, a control 1840, 1880, and a plurality of data 1860*a*, 1860*b*, 1860*c* for a first, second, and third UE.

In some embodiments, a self-contained subframe 1801 comprises DL control 1810, DL/UL data 1820*a*, 1820*b*, 1820*c*, guard 1830 and UL/DL control 1840. DL control 1810 can schedule UEs' DL/UL data 1820*a*, 1820*b/c* multiplexed in a FDM manner. In some embodiments, a self-contained subframe 1802 comprises DL control 1850, DL/UL data 1860*a*, 1860*b*, 1860*c*, guard 1870 and UL/DL control 1880. DL control 1850 can schedule UEs' DL/UL data 1860*a*, 1860*b*, 1860*c* multiplexed in a TDM manner. In such embodiments, DL control 1810/1850 can schedule DL/UL data of multiple UEs according to any combination of FDM or TDM. In such embodiments, UL/DL control 1840/1880 contains A/N corresponding to the decoding results of the UL/DL data of multiple UEs. The multiple UEs' A/N can be multiplexed according to any combination of TDM, FDM or CDM.

In some embodiments, the frame structure of 1802 is used and the multiple UEs' DL/UL data 1860*a*, 1860*b*, 1860*c* are multiplexed in a TDM manner. Then, the UL/DL control 1840/1880 is also TDM'ed to account for the situation that the third UE's data is decoded at the latest time. In some embodiments, multiple radio access technologies (RATs) coexist in one or more spectrum bands. In one such embodiment, LTE, Wi-Fi, and a New RAT are utilized by one or more operators on licensed or unlicensed spectrum. In another such embodiment, multi-RATs are configured and utilized by the network on one or more spectrum bands as different technology-specific slices.

Figure 19:
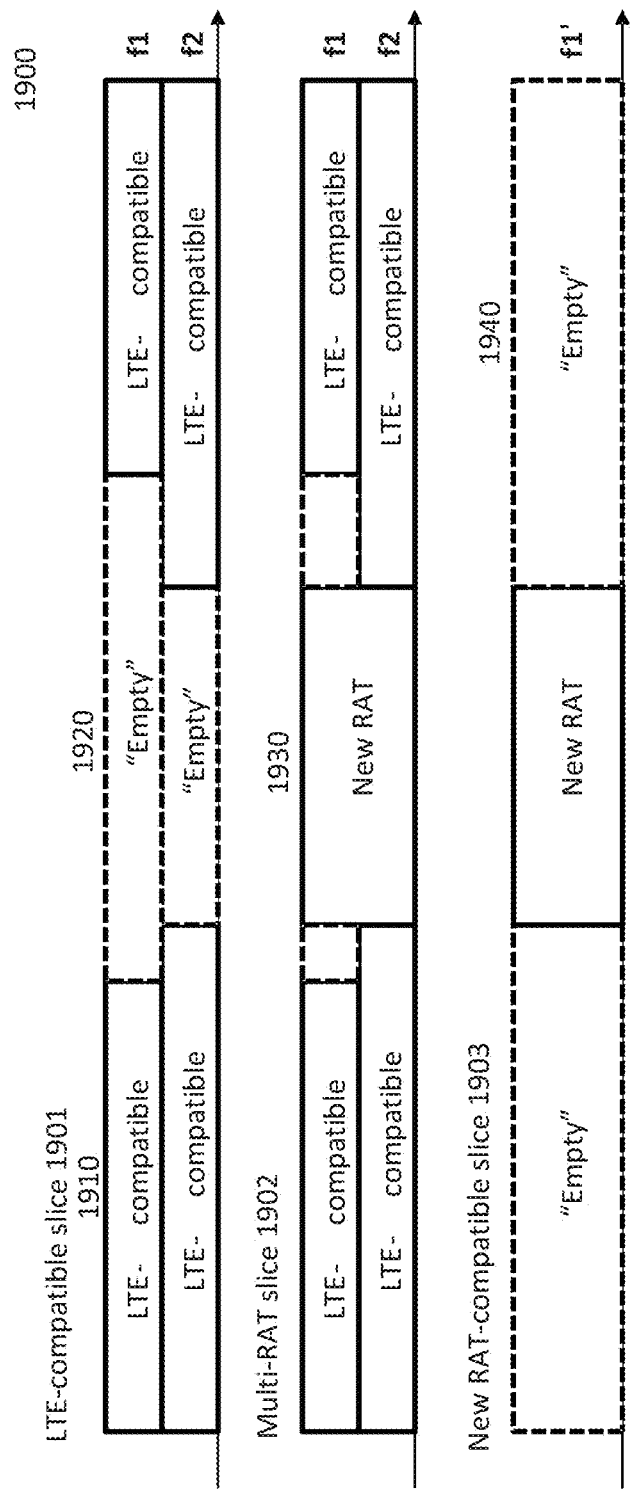
FIG. 19 illustrates a multi-radio access technology (RAT) operation according to embodiments of the present disclosure.

FIG. 19 1900 illustrates a multi-radio access technology (RAT) operation according to embodiments of the present disclosure. An embodiment of the multi RAT operation shown in FIG. 19 1900 is for illustration only. One or more of the components illustrated in FIG. 19 1900 can be implemented in specialized circuitry configured to perform the noted functions or one or more of the components can be implemented by one or more processors executing instructions to perform the noted functions. Other embodiments are used without departing from the scope of the present disclosure. As shown in FIG. 19 1900, the multi RAT operation 1900 comprises a LTE-compatible slice 1901, a multi-RAT slice 1902, and a new RAT-compatible slice 1903. Furthermore, the LTE-compatible slice perspective 1901 comprises a plurality of LTE-compatible fields and a plurality of empty fields 1920. The multi-RAT slice perspective 1902 comprises a new RAT field 1930. The new RAT-compatible slice perspective comprises an empty field 1940.

As shown in FIG. 19 1900, a configuration of multi-RAT slices on two carriers, f1 and f2, is illustrated according to some embodiments of the current invention. In FIG. 19 1900, f1' denotes a bonded BW of f1+f2. In FIG. 19 1900, a "slice" can be interpreted as "subframes," "frames," or "UEs." The plurality of LTE-compatible slices 1910 are configured on f1 and f2, while a single larger-bandwidth new RAT slice (new RAT slice 1930) is configured on f1'.

In some embodiments, the multi-RAT frames (slice) 1902 can be differently seen by different types of UEs. In one such embodiment, a UE that supports LTE interprets the multi-RAT frame 1902 as the LTE-compatible slice 1901. In some embodiments, a UE that supports only the new-RAT interprets the multi-RAT frame 1902 as a new-RAT compatible slice 1903.

In some embodiments, an LTE UE configured on the multi-RAT frames 1902 can be configured to continuously detect presence of CRS in the LTE compatible region of 1910. When CRS is not present in the "Empty" region 1920, the UE can skip reception and assume that no control/data signals or channels are assumed to be present in the empty fields 1920.

In some embodiments, an advanced UE configured on the multi-RAT frames 1902 can be configured to receive signals from both LTE compatible region 1910 and new RAT region 1930. In some embodiments, an advanced UE configured on the multi-RAT frames 1902 can be configured to receive signals from the new RAT region 1930. Furthermore, the advanced UE can treat the LTE compatible region 1902 as "empty" region 1940. In one embodiment, the advanced UE detects the new RAT region 1930, by detecting a "signature" signal different from LTE CRS.

In some embodiments, a UE is configured with the LTE-compatible slice 1910 as an "anchor" slice. In some embodiments, a UE is configured with the new RAT slice 1930 as an anchor slice. In some embodiments, a UE is configured with an anchor slice for each of the LTE-compatible slice 1910 and the new RAT slice 1930. In such embodiments, the "anchor" slice provides system information for configuration and operating on the other slices and also can serve as a "fallback" slice if connections to the other slices are lost or during an IDLE mode period.

License-assisted access (LAA) is one example of a LTE-compatible technology which can coexist with other RATs on the same carrier, since it operates with a frame structure consisting of dynamic DL/UL bursts of subframes subject to a listen-before talk (LBT) protocol.

In some embodiments, each multi-RAT slice 1902 utilizes an LBT protocol or other distributed spectrum sharing protocol (e.g. based on carrier sense multiple access with collision avoidance (CSMA/CA)) in order to independently and dynamically access the spectrum and coexist with other multi-RAT slices. This may be beneficial to support forward compatibility, as the introduction of new PHY slices of different RATs can be accomplished without requiring backwards compatibility of the other slices, or introducing additional configuration signaling which older devices may not be able to utilize.

In some embodiments, the multi-RAT slices 1902 are configured and scheduled by one or more network entities (e.g. eNB or multi-RAT controller). The ratio of time/frequency resources configured (e.g. TDM/FDM pattern) and utilized by each slice may be determined based on service requirements (e.g. eMBB or URLL), traffic load associated with each slice, or coverage requirement and exchanged across network entities of one or more operators. This may be beneficial to support efficient multiplexing of the slices.

In some embodiments, different slices are FDM'ed wherein guard bands are present to avoid time overlapping DL/UL subframes. Specifically, the new RAT slice 1930 operates on a larger bandwidth (f1') than either of the LTE-compatible PHY slices (f1 and f2) 1910. In this case coordination between the configurations of the different slices is beneficial to avoid unnecessarily large "Empty" periods. In such embodiments, a TDM/FDM pattern is established between the multi-RAT slices, which includes some fixed or semi-statically configured resources for each slice and/or periods where resources are flexibly allocated between slices of different RATs.

In some embodiments, the availability of one or more multi-RAT slices is indicated by broadcast information; or alternatively, it is preconfigured to a given UE based on device capability or service profile. In one such embodiment, a UE requests to be configured with one or more Multi-RAT slices upon initial connection to an anchor slice or upon initiation of one or more services which are associated with a slice. In such embodiments, in case different slices are associated with multiple operators, the operator identity (e.g. public land mobile network (PLMN)) may also be indicated as part of the slice configuration signaling procedure.

5G supports diverse spectrum and diverse services and devices. The air interface of 5G needs to support scalable OFDM numerologies to meet diverse deployment scenarios. Example of OFDM numerology includes subcarrier spacing, a length of cyclic prefix and a number of OFDM symbols in one SF. In this present disclosure, corresponding PHY designs to cope with multiple OFDM numerologies are disclosed.

A wireless system may allow more than one OFDM numerology to different types of transmissions. Depending on the configured OFDM numerology, the UE procedure may be configured accordingly. In wireless systems, one eNB could form multiple total radiated powers (TRPs) as a group, which is referred to as TRP group (TRPG). Each TRPG could have TRPG ID. Within TRPG, there is no radio resource control (RRC) signaling needed for mobility and there is some RRC reconfiguration for inter-TRPG mobility.

In some embodiments, an OFDM numerology configuration may comprise at least some of the followings: the subcarrier spacing of OFDM; the length of OFDM symbol and the length of cyclic prefix; the bandwidth used for initial-access signal transmission; and the number of OFDM symbols in one subframe, the length of one subframe.

In some embodiments, the default OFDM numerology is configured for initial-access signal (IS) transmission. In such embodiments, a UE is configured to detect initial-access signals using the default OFDM numerology. One example of default numerology is that the subcarrier spacing is 15 kHz (and/or the bandwidth is 1.4 MHz).

In some embodiments, the default OFDM numerology is the smallest subcarrier spacing (and/or the largest OFDM symbol length) supported by the system on the particular carrier frequency. In some embodiments, the default OFDM numerology is a particular numerology which may be commonly applied to UEs accessing all the carrier frequency bands, which is known to both eNB and UE.

In some embodiments, the default OFDM numerology is determined as a function of an integer determined by carrier frequency. In such embodiments, the UE utilizes the carrier frequency(s) to derive the default OFDM numerology as shown in Table 3. The carrier frequency in Table 3 corresponds to a representative carrier frequency, around the number shown in the entry. For example, 2 GHz in the table entry implies carrier frequencies around 2 GHz, e.g., 2.1 GHz, 1.9 GHz, etc.

TABLE 3

| Carrier frequency | Subcarrier spacing of the default numerology |
| --- | --- |
| Frequency range including 700 MHz | 15 kHz |
| Frequency range including 2 GHz | 15 kHz |
| Frequency range including 3.5 GHz | 15 kHz |
| Frequency range including 6 GHz | 15 kHz |
| Frequency range including 15 GHz | 30 kHz |
| Frequency range including 30 GHz | Alt1: 60 kHz Alt2: 75 kHz |
| Frequency range including 70 GHz | Alt 1: 60 kHz Alt2: 75 kHz |

In some embodiments, the subcarrier spacing (and/or bandwidth) is scaled correspondingly according to the typical available bandwidth in the corresponding carrier frequency. In some embodiments, a UE is configured in the higher layer of the default numerology.

In some embodiments, the UE is configured in the time-frequency resources (e.g., periodically recurring subframes) in which the default OFDM numerology is utilized. In one example, a UE detects initial-access signals, including synchronization signals and/or broadcast signals, etc. In this example, the UE can identify the OFDM index and/or subframe number (or index of time interval X) and timing from some of the initial-access signals. In another example, a UE can be configured with an alternative OFDM numerology to use outside the default-numerology time-frequency resources. In yet another example, a UE performs rate matching for xPDSCH/xPUSCH around the initial-access signal resources. In yet another example, a UE measures the measurement RS for RRM measurement during initial access procedure. In such embodiments, one or more of the following can be mapped onto the time-frequency resources in which the default numerology is utilized: initial-access signals; an xPDSCH conveying a configuration of an alternative OFDM numerology (can be broadcast signaling or UE-specific signaling); an xPDSCH/xPUSCH; and measurement RS for RRM measurement.

Figure 20:
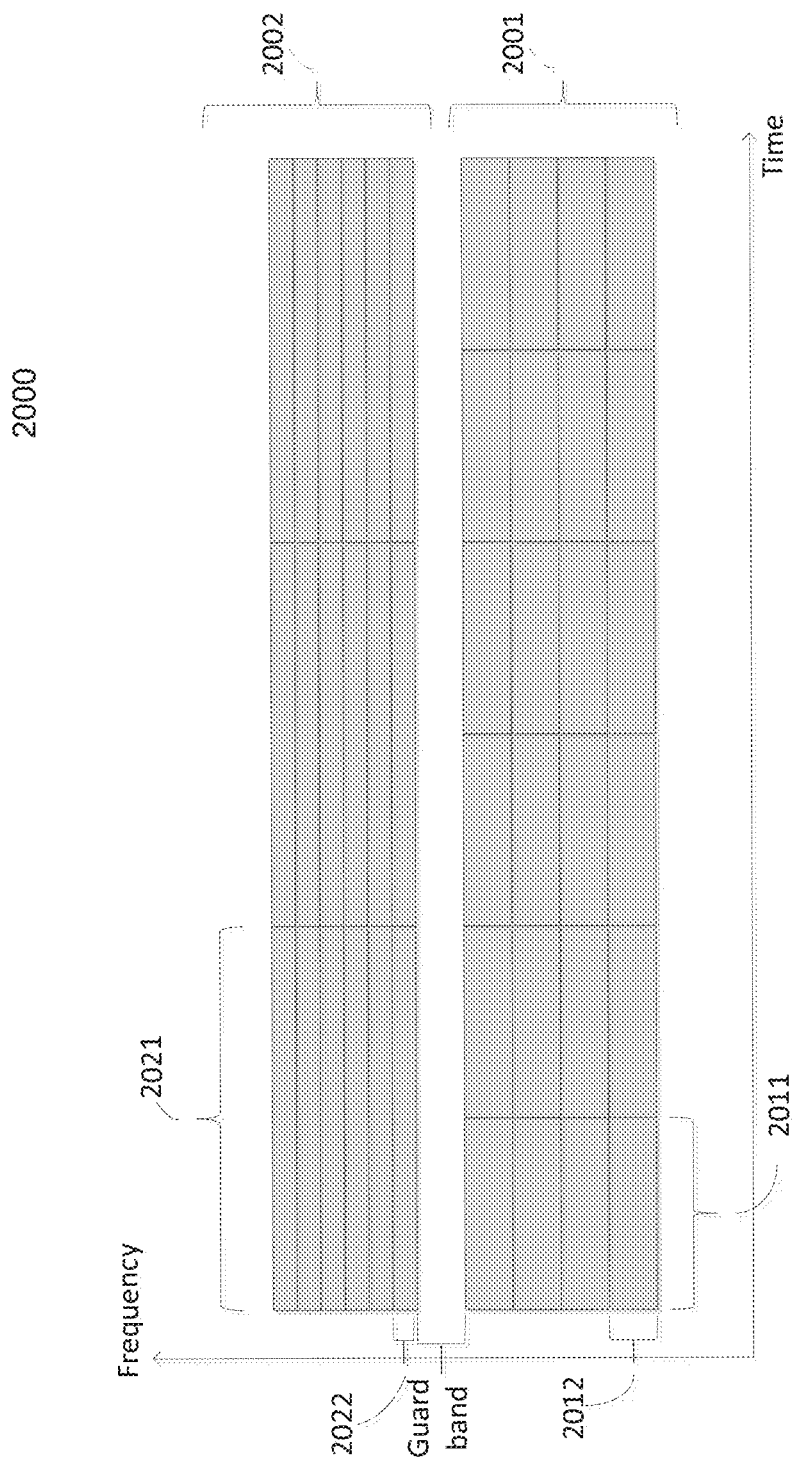
FIG. 20 illustrates a default OFDM numerology in a frequency division multiplexing (FDM) according to embodiments of the present disclosure.

FIG. 20 2000 illustrates a default OFDM numerology in a frequency division multiplexing (FDM) according to embodiments of the present disclosure. An embodiment of the default OFDM numerology in the FDM shown in FIG. 20 2000 is for illustration only. One or more of the components illustrated in FIG. 20 2000 can be implemented in specialized circuitry configured to perform the noted functions or one or more of the components can be implemented by one or more processors executing instructions to perform the noted functions. Other embodiments are used without departing from the scope of the present disclosure. As shown in FIG. 20 2000, the default OFDM numerology in a frequency division multiplexing (FDM) comprises a alternative OFDM numerologies 2001, a default OFDM numerology 2002. The default OFDM numerology 2002 comprises an OFDM symbol length 2021 and a subcarrier spacing 2022. The alternative OFDM numerology 2001 comprises an OFDM symbol length 2011 and a subcarrier spacing 2012.

In some embodiments, an alternative OFDM numerology is signaled on initial-access signals or other broadcast channels transmitted using a default OFDM numerology. In example of FDM'ing, a default OFDM numerology and an alternative OFDM numerology in a same time interval is shown in FIG. 20 2000.

As shown in FIG. 20 2000, the alternative OFDM numerology 2001 has the OFDM symbol length 2011 and the subcarrier spacing 2012, and the default OFDM numerology 2002 has the OFDM symbol length 2021 and the subcarrier spacing 2022. In FIG. 20 2000, the subcarrier spacing 2022 of OFDM numerology 2002 is a half of the subcarrier spacing 2012 of OFDM numerology 2001. And the OFDM symbol length 2021 of OFDM numerology 2002 is double the OFDM symbol length 2011 of OFDM numerology 2001.

In some embodiments, the default numerology is used for the initial access signals transmitted in a subband in a time interval, and the alternative numerology is used for the other subbands in the same time interval, as illustrated in FIG. 20 2000. A guard band can be inserted between the subband of initial-access signals using the default OFDM numerology and the subband for other signals using other OFDM numerology. The size of guard band could be configured by upper layer through RRC messages.

The alternative OFDM numerology could be either same to or different from a default OFDM numerology used for initial-access signal transmission. In some embodiments, a UE is configured to receive signals generated with the default numerology in a subband on which the initial-access signals are mapped. On the other hand, the UE is further configured to receive signals generated with the alternative numerology outside the subband, when the UE is configured with the alternative numerology.

In some embodiments, a physical cell ID (PCID) or a new ID defined in NR (e.g., TRPG ID, hyper-cell ID, or cell ID), which is inferred by the detected synchronization signals. In the present disclosure, this ID is referred to ID X.

In some embodiments, the alternative OFDM numerology is indicated by an implicit or an explicit signaling scheme during the initial access procedure. In one example, the alternative OFDM numerology is implicitly indicated by the value of ID X. For this purpose, the ID X's are partitioned into a few groups. Each group corresponds to one alternative OFDM numerology configuration. A UE is configured to first decode the ID X from the initial-access signals and then derive an alternative OFDM numerology configuration depending on which group the ID X belongs to. In another example of a joint encoding with ID X. In such example, both the alternative OFDM numerology information (which can be few bit information, e.g., 1 or 2 bits) and the ID X are inferred by the sequence IDs of the initial-access signals. In yet another example of a few bits on the MIB on xPBCH. In such example, two bits on MIB on xPBCH to indicate the value of the alternative OFDM numerology configuration. Bit value 00 indicates value #1 for the alternative OFDM numerology, bit value 01 indicates value #2 for the alternative OFDM numerology configuration, bit value 10 indicates value #3 for the alternative OFDM numerology and bit value 11 indicates value #4 for the alternative OFDM numerology.

In yet another example of an implicit indication by the time-frequency resource location of a particular initial-access signal, a UE can detect the particular initial-access signal to determine an alternative OFDM numerology. In such example, a first synchronization signal is mapped on a first subcarrier index (can be for example, a center subcarrier of an NR carrier) and a first synchronization signal is used to obtain synchronization around the subcarrier corresponding to the first subcarrier index. A second synchronization signal is mapped on a second subcarrier index which is an offset different from the first subcarrier index and the offset value can be chosen from one of e.g., 4 candidate values. One example is the subcarrier index of the second synchronization signal is given by an equation, e.g., $ki=kc+\Delta ki$, where $i \in \{0, 1, 2, 3\}$ corresponds to a specific alternative numerology.

Figure 21:
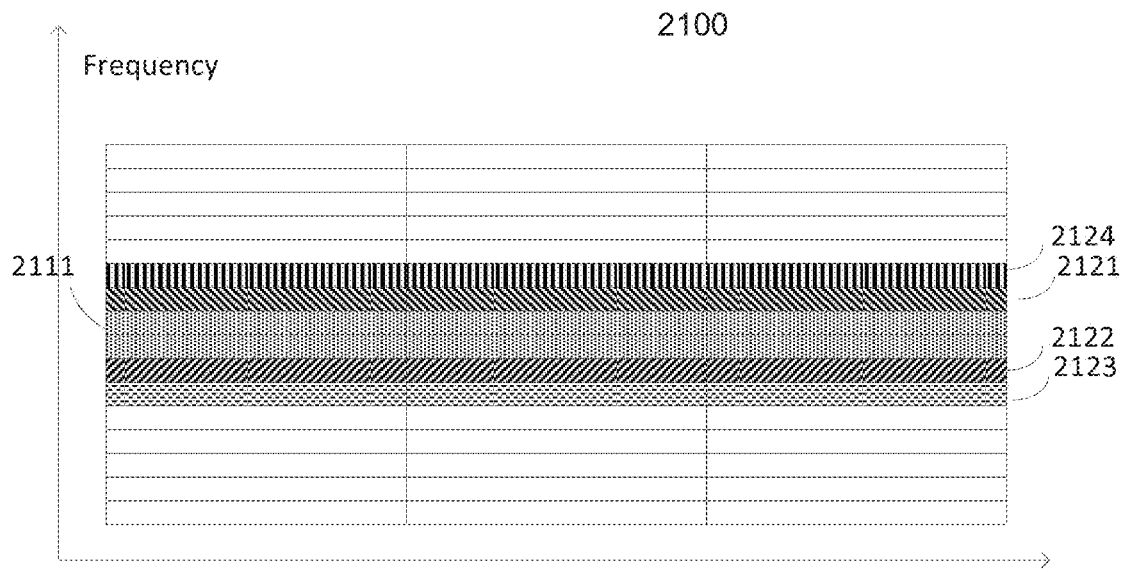
FIG. 21 illustrates a subcarrier index of the first synchronization signal according to embodiments of the present disclosure.

FIG. 21 2100 illustrates a subcarrier index of the first synchronization signal according to embodiments of the present disclosure. An embodiment of the subcarrier index of the first synchronization signal shown in FIG. 21 2100 is for illustration only. One or more of the components illustrated in FIG. 21 2100 can be implemented in specialized circuitry configured to perform the noted functions or one or more of the components can be implemented by one or more processors executing instructions to perform the noted functions. Other embodiments are used without departing from the scope of the present disclosure.

As shown in FIG. 21 2100, the subcarrier index of the first synchronization signal comprises a plurality of frequency locations (subcarrier locations). The first synchronization signal is mapped on subcarriers corresponding to frequency location 2111. The second synchronization signal has four frequency locations 2121, 2122, 2123, and 2124 corresponding to the four different subcarrier offset values $\Delta ki$ Each subcarrier location of 2121, 2122, 2123 and 2124 corresponds to one alternative OFDM numerology index. The UE is configured to detect the second synchronization signal and then identify the alternative OFDM numerology according the subcarrier index of the second synchronization signal.

Figure 22:
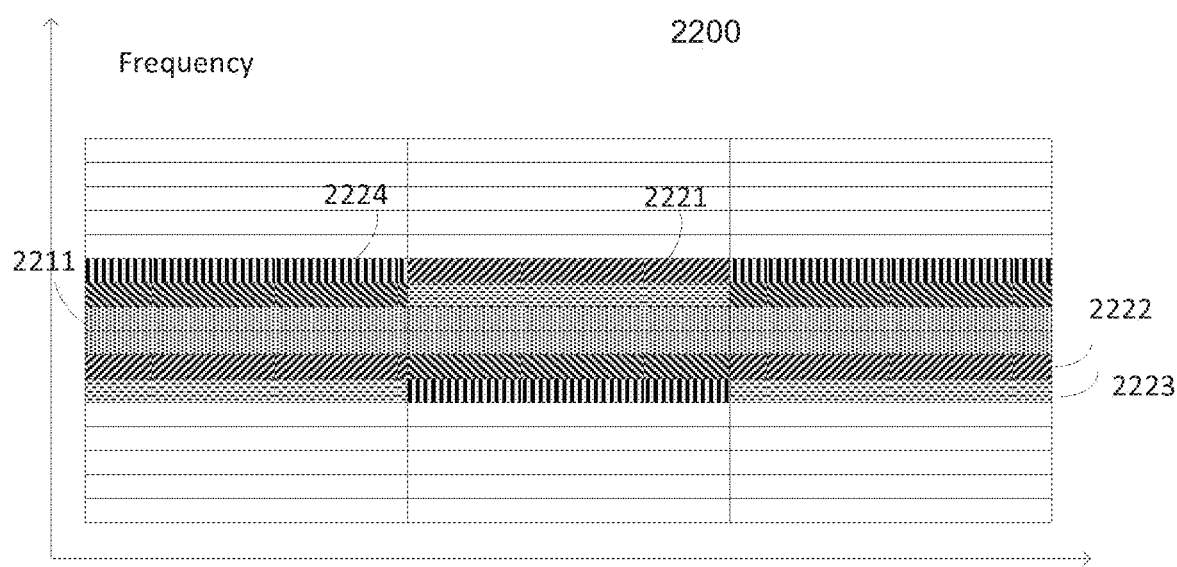
FIG. 22 illustrates a subcarrier index of the second synchronization signal according to embodiments of the present disclosure.

FIG. 22 2200 illustrates a subcarrier index of the second synchronization signal according to embodiments of the present disclosure. An embodiment of the subcarrier index of the second synchronization signal shown in FIG. 22 2200 is for illustration only. One or more of the components illustrated in FIG. 22 2200 can be implemented in specialized circuitry configured to perform the noted functions or one or more of the components can be implemented by one or more processors executing instructions to perform the noted functions. Other embodiments are used without departing from the scope of the present disclosure.

As shown in FIG. 22 2200, the subcarrier index of the second synchronization signal comprises a plurality of time-frequency resource locations 2211, 2221, 2222, 2223, 2224. In one example, a first synchronization signal is mapped on a first time-frequency resource and is used to obtain synchronization of an NR carrier. A second synchronization is mapped to a second time-frequency mapping pattern. The pattern can be chosen from one of e.g., 4 time-frequency patterns and each pattern index corresponds to a specific alternative OFDM numerology.

As shown in FIG. 22 2200, one example is the subcarrier index of the second synchronization signal on OFDM symbol 1 is given by an equation, e.g., $ki(1)=kc+\Delta ki(1)$, where $i \in \{0, 1, 2, 3\}$ corresponds to a specific alternative numerology. As illustrated in FIG. 22 2200, a first synchronization signal is mapped on time-frequency resource 2211. A second synchronization signal has four optional time-frequency resource locations 2221, 2222, 2223 and 2224. Each time-frequency pattern of 2221, 2222, 2223, and 2224 corresponds to a specific alternative OFDM numerology. The UE is configured to detect a second synchronization signal and then identify the alternative OFDM numerology according the time-frequency mapping pattern of the second synchronization signal.

In some embodiments of a few bits in xSIB, 2 bits in xSIB that is sent on a physical channel are generated according to a default OFDM numerology. In such embodiments, the value of these 2 bits indicates the alternative OFDM numerology.

In some embodiments, one bit information is indicated by ID X or a sequence ID of an initial-access signal or on xPBCH, on whether an alternative OFDM numerology is same as the default OFDM numerology or not. If the value of this bit indicates that an alternative OFDM numerology is different from a default OFDM numerology, the UE is configured to further decode 2 bits in xPBCH (if the sequence ID is used for the one bit indication) or in xSIB (if the PBCH carries the one bit information) which is sent with a default OFDM numerology and these 2 bits indicates the alternative OFDM numerology. In some embodiments, the alternative numerology is UE-specifically configured via RRC signaling.

Figure 23:
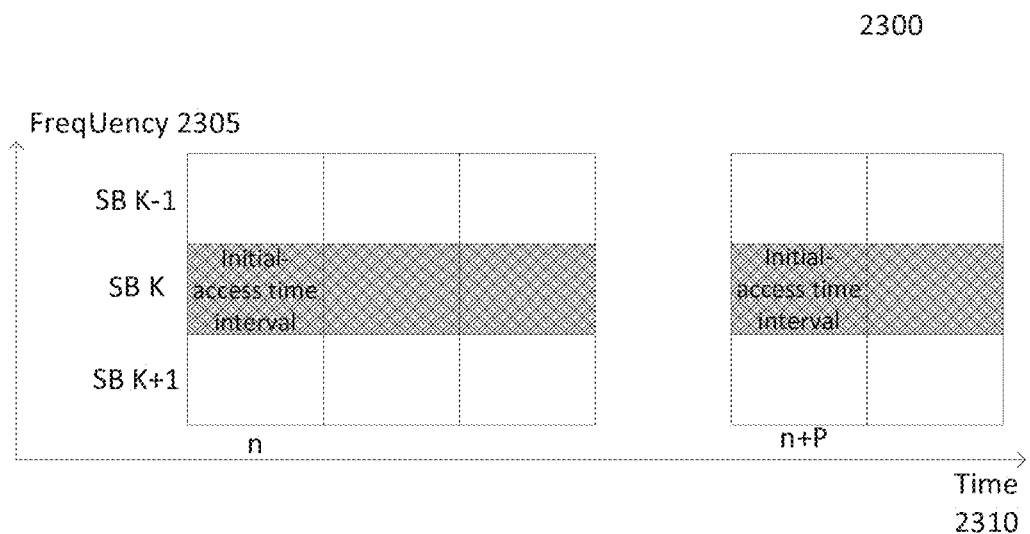
FIG. 23 illustrates a default numerology on subband according to embodiments of the present disclosure.

FIG. 23 2300 illustrates a default numerology on subband according to embodiments of the present disclosure. An embodiment of the default numerology on subband shown in FIG. 23 2300 is for illustration only. One or more of the components illustrated in FIG. 23 2300 can be implemented in specialized circuitry configured to perform the noted functions or one or more of the components can be implemented by one or more processors executing instructions to perform the noted functions. Other embodiments are used without departing from the scope of the present disclosure.

As shown in FIG. 23 2300, the default numerology on subband comprises a frequency resource 2305 for an initial-access signal and a time resource 2310 for the initial-access signal.

In some embodiments, a UE is configured to use an alternative OFDM numerology to receive some broadcast and/or multicast transmission, for example xPDCCH and/or xPDSCH that carries information to be received by a group of UEs including the UE. The UE can be configured to use the alternative OFDM numerology to transmit uplink access signal, for example, the xPRACH signals.

In some embodiments, a frame structure is designed for the transmission of initial-access signals with a default OFDM numerology configuration. A time interval in which initial-access signals are mapped is called an initial-access time interval (which can be a unit of time interval X or a subframe). The time frequency resources in which initial-access signals are mapped utilize a default OFDM numerology configuration and one UE is configured to use the default OFDM numerology to detect the initial-access signals. A time interval in which no initial-access signals are mapped is called a normal time interval. An alternative numerology is utilized in a normal time interval.

Time-frequency resources on which default numerology is utilized can be explicitly or implicitly configured to a UE. In some embodiments, the default numerology is utilized in at least those subbands on which the initial-access signals are mapped, across all the time intervals unless otherwise configured explicitly. As illustrated in FIG. 23 2300, the initial-access signals are transmitted with a period P, in subframe (time interval) n and n+P in a subband (SB) K. In this case, the UE may assume that the default numerology is used in the SB K in all the subframes unless otherwise configured.

Figure 24:
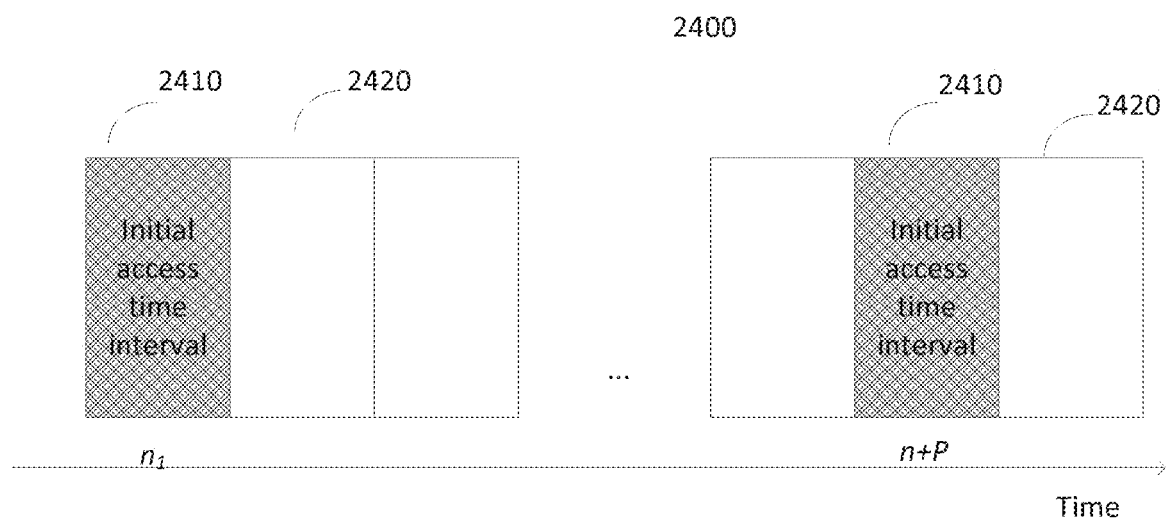
FIG. 24 illustrates a numerology on subband according to embodiments of the present disclosure.

FIG. 24 2400 illustrates a numerology on subband according to embodiments of the present disclosure. An embodiment of the numerology on subband shown in FIG. 24 2400 is for illustration only. One or more of the components illustrated in FIG. 24 2400 can be implemented in specialized circuitry configured to perform the noted functions or one or more of the components can be implemented by one or more processors executing instructions to perform the noted functions. Other embodiments are used without departing from the scope of the present disclosure.

As shown in FIG. 24 2400, the numerology on subband comprises a time interval with initial-access signal 2410 and a time interval without initial-access signal 2420. In some embodiments, the default numerology is utilized in at least these time intervals (across the system BW of the configured NR carrier) on which the initial-access signals are mapped as illustrated in FIG. 24 2400.

In some embodiments, a plurality of time intervals are configured with initial-access signals and other time intervals are configured without initial-access signals. As illustrated in FIG. 24 2400, time intervals n1, n2 (=n+P in some embodiments), . . . , (e.g., 2410) are configured with initial-access signals and other time intervals are configured without initial-access signal 2420. In time intervals with initial-access signals 2410, a UE is configured to detect initial-access signals with a default numerology. In the time interval without initial-access signals 2420, the UE can be configured to receive/transmit signals using the alternative numerology.

In some embodiments, in an initial-access time interval, the time frequency resources in which initial-access signals (including sync signals, xPBCH for MIB, and ePBCH for SIB, etc.) are generated utilizing a default OFDM numerology configuration and a UE is configured to use the default OFDM numerology to detect the initial-access signals. In some embodiments, the initial access signals are mapped across all the OFDM symbols in the initial-access time interval. In some embodiments, the time frequency resources in the initial-access time interval, not used by initial-access signals, can be used to transmit other signals, for example xPDCCH and xPDSCH.

Figure 25A:
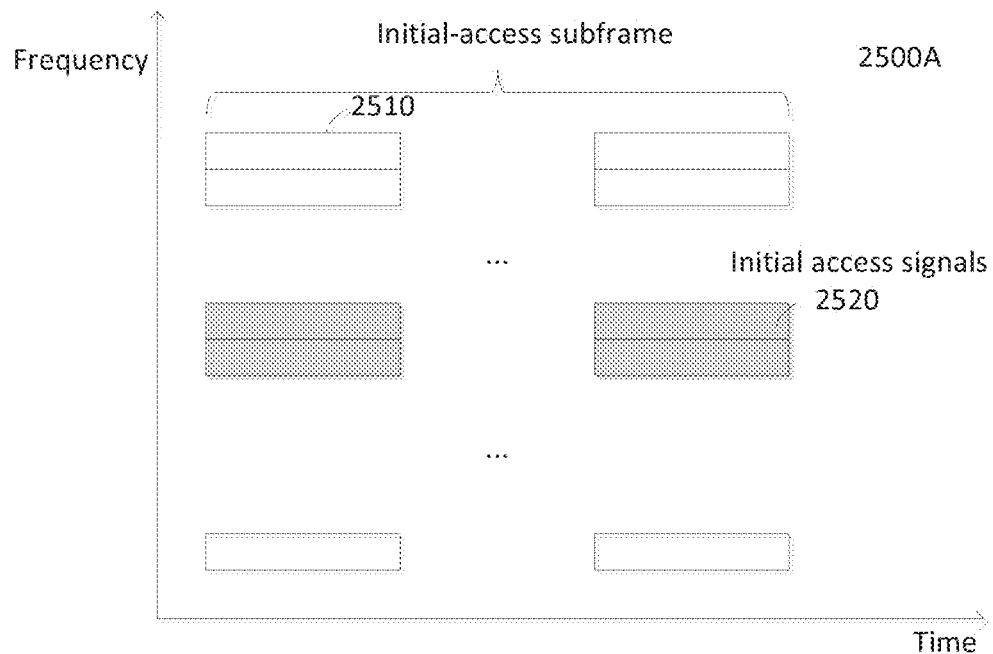
FIG. 25A illustrates a time frequency resources for initial access according to embodiments of the present disclosure.

FIG. 25A 2500A illustrates a time frequency resources for initial access according to embodiments of the present disclosure. An embodiment of the time frequency resources for initial access shown in FIG. 25A 2500A is for illustration only. One or more of the components illustrated in FIG. 25A 2500A can be implemented in specialized circuitry configured to perform the noted functions or one or more of the components can be implemented by one or more processors executing instructions to perform the noted functions. Other embodiments are used without departing from the scope of the present disclosure.

As shown in FIG. 25A 2500A, the time frequency resources for initial access 2500A comprises a non-initial-access resources/signals 2510 and an initial-access resources/signals 2520. In some embodiments, all the time frequency resources in the initial-access time interval (subframe) are constructed with the default OFDM numerology (say OFDM numerology A) as illustrated in FIG. 25A 2500A. In FIG. 25A 2500A, all the time frequency resources and signals, (non-initial-access resources/signals 2510 and initial-access resources/signals 2520) in the initial access subframe are constructed with OFDM numerology A. In this case, a UE is configured to detect the initial-access signals according to the default OFDM numerology. The time frequency resources 2510 in which initial-access signals are not mapped can be used for transmission of other signals, e.g., xPDCCH and xPDSCH.

Figure 25B:
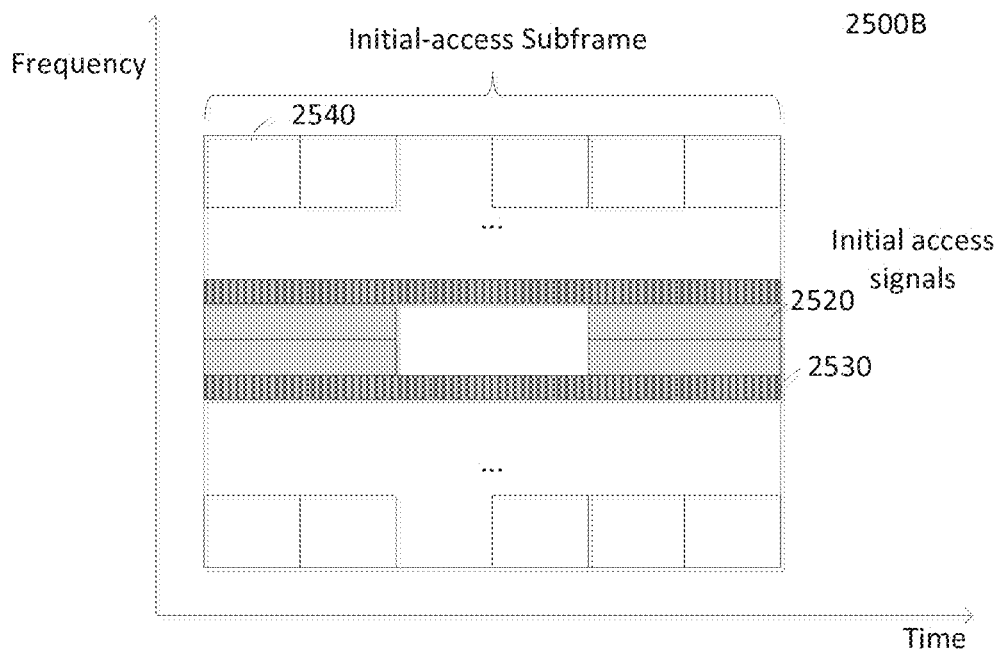
FIG. 25B illustrates another time frequency resources for initial access according to embodiments of the present disclosure.

FIG. 25B 2500B illustrates another time frequency resources for initial access according to embodiments of the present disclosure. An embodiment of the time frequency resources for initial access shown in FIG. 25B 2500B is for illustration only. One or more of the components illustrated in FIG. 25B 2500B can be implemented in specialized circuitry configured to perform the noted functions or one or more of the components can be implemented by one or more processors executing instructions to perform the noted functions. Other embodiments are used without departing from the scope of the present disclosure.

As shown in FIG. 25B 2500B, the time frequency resources for initial access comprises a resource element constructed with OFDM numerology B 2540 and a guard band 2530. In some embodiments, the subband signals used for generating the initial-access signals in an initial-access time interval (subframe) are constructed using the default OFDM numerology and the signals mapped outside the subband can be constructed using the alternative OFDM numerology (say OFDM numerology B) as illustrated in FIG. 25B 2500B.

If the system bandwidth is larger than the subband size for initial-access signals, the other subbands could be used for transmission of other signals, for example xPDCCH and xPDSCH, and utilizes the alternative OFDM numerology. The guard band 2530 can be inserted between the subband of initial-access signals using the default OFDM numerology and the subband for other signals using other OFDM numerology. The size of guard band could be configured by upper layer through RRC messages.

Figure 25C:
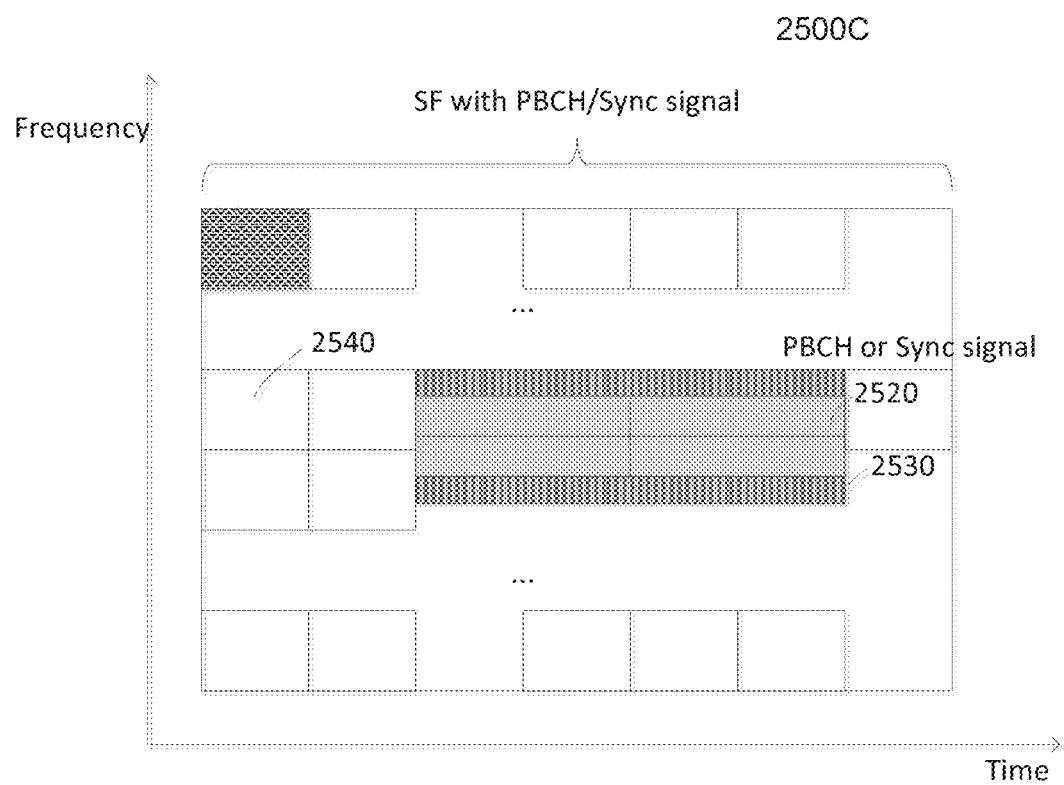
FIG. 25C illustrates a time frequency resources for a physical downlink channel (PDCH) or synchronization signal initial access according to embodiments of the present disclosure.

FIG. 25C 2500C illustrates a time frequency resources for a physical downlink channel according to embodiments of the present disclosure. An embodiment of the time frequency resources for a physical downlink channel shown in FIG. 25C 2500C is for illustration only. One or more of the components illustrated in FIG. 25C 2500C can be implemented in specialized circuitry configured to perform the noted functions or one or more of the components can be implemented by one or more processors executing instructions to perform the noted functions. Other embodiments are used without departing from the scope of the present disclosure.

In some embodiments, to enable simultaneous reception of initial-access signals using a default OFDM numerology and other signals using another OFDM numerology in an initial-access subframe, a UE is configured to be capable of simultaneously processing two different OFDM numerologies.

In some embodiments, the time interval to transmit the initial-access signals is shorter than the whole duration of the initial-access time interval as shown in FIG. 25C 2500C. The initial-access signals are transmitted in a subband in a few consecutive OFDM symbols (in terms of the default OFDM numerology) of the initial-access time interval (subframe). All the other time-frequency resources can be used for transmission of other signals, for example, xPDCCH and xPDSCH utilizing another OFDM numerology, for example, an alternative OFDM numerology. The guard band 2530 is inserted only on the OFDM symbols where initial-access signals are transmitted.

A signaling can be introduced so that a UE can identify the set and/or the number of time frequency resources that are available for data and control information reception/transmission and the OFDM numerology used, in an initial-access time interval (subframe); then the UE is configured to do a rate matching for the data/control signal transmission accordingly in access time interval (subframe). In some embodiments, the signaling to facilitate one UE's reception/transmission (or let one UE know the region of initial-access signal and OFDM numerology used for time frequency resources available) can be conveyed according to the following example schemes: on a system information block (SIB); on the master information block (MIB) on the xPBCH; the information is jointly encoded with other information, for example, physical cell ID, OFDM symbol number, initial-access signal sequence; via RRC messages; and via a dynamic downlink control information (DCI) signaling on xPDCH. In one example of the dynamic DCI signaling, the DCI that is sent with an alternative OFDM numerology indicates the OFDM numerology used for the xPDSCH being scheduled by one DCI.

In some embodiments, a UE could be configured with one or more alternative OFDM numerology configurations. The configuration could be signaled by the upper layer, for example, through RRC message. The configuration can be UE specific. The configuration can be dependent on UE capability or UE category and type. One example is one UE is configured with different numerologies for PCell and SCell in the case of carrier aggregation. In some embodiments, one numerology is configured for delay-tolerant service while another numerology is configured for delay-sensitive service.

In some embodiments, a few bits in RRC message to explicitly indicate the value of a secondary OFDM numerology configuration to one UE. A secondary OFDM numerology configuration could be configured for one category of service and/or for one component carrier. In some embodiments, a few bits in dynamic DCI signaling on xPDCCH that is sent by an alternative OFDM numerology to indicate a secondary OFDM numerology used for one data transmission scheduled by the xPDCCH. In some embodiments, a few bits in dynamic DCI signaling on xPDCCH to indicate a secondary OFDM numerology that should be used within a particular period. In some embodiments, the alternative numerology and secondary numerology configuration are used for the transmission of signals other than initial-access signals, for example being used for the transmission of xPDCCH, xPDSCH and x physical uplink shared channel (xPUSCH).

In some embodiments, each element in the resource grid for antenna port p is called a resource element and is uniquely identified by the index pair (k,l) in a slot (time interval) where $k=0, \ldots, N_{RB}^{DL}N_{sc}^{RB}-1$ and $l=0, \ldots, N_{symb}^{DL}-1$ are the indices in the frequency and time domains, respectively. Resource element (k,l) on antenna port P corresponds to the complex value $a_{k,l}^{(p)}$.

In some embodiments, a resource grid is defined for each configured OFDM numerology. In one example, resource elements (k,l) on antenna port p and a corresponding resource grid are defined for the default numerology. In another example, resource elements (k',l') on antenna port p' and a corresponding resource grid are defined for the alternatively numerology.

When the subcarrier spacing of the alternative numerology is α multiple of the subcarrier spacing of the default numerology ($\alpha=1, 2, 4, 8, \ldots, \frac{1}{2}, \frac{1}{4}, \frac{1}{8}, \ldots$), the range of the indices (k,l) and (k',l') are determined according to the default numerology, $k=0, \ldots, N_{RB}^{DL}N_{sc}^{RB}-1$ and $l=0, \ldots, N_{symb}^{DL}-1$. In one example, the alternative numerology is determined by $k'=0, \ldots, N_{RB}^{DL}N_{sc}^{RB}/\alpha-1$ and $l'=0, \ldots \alpha N_{symb}^{DL}-1$. In another example, the alternative numerology is determined by $k'=0, \ldots, \alpha N_{RB}^{DL}N_{sc}^{RB}-1$ and $l'=0, \ldots, N_{symb}^{DL}/\alpha-1$.

In such example, the indices from the two resource grids identify $k, k+1, \ldots, k+\alpha-1$ on the resource grid with default numerology corresponds to $k'=\lfloor k/\alpha \rfloor$ in the resource grid with alternative numerology. In such example, l in the resource grid with default numerology corresponds to $l'=\alpha l, \alpha l+1, \ldots, \alpha l+\alpha-1$ in the resource grid with alternative numerology.

In some embodiments, the indices from the two resource grids identify k in the resource grid with default numerology corresponds to $k'=\alpha k, \alpha k+1, \ldots, \alpha k+\alpha-1$ in the resource grid with alternative numerology. In such embodiments, l in the resource grid with default numerology corresponds to $l'=\lfloor l/\alpha \rfloor$ in the resource grid with alternative numerology.

Figure 26A:
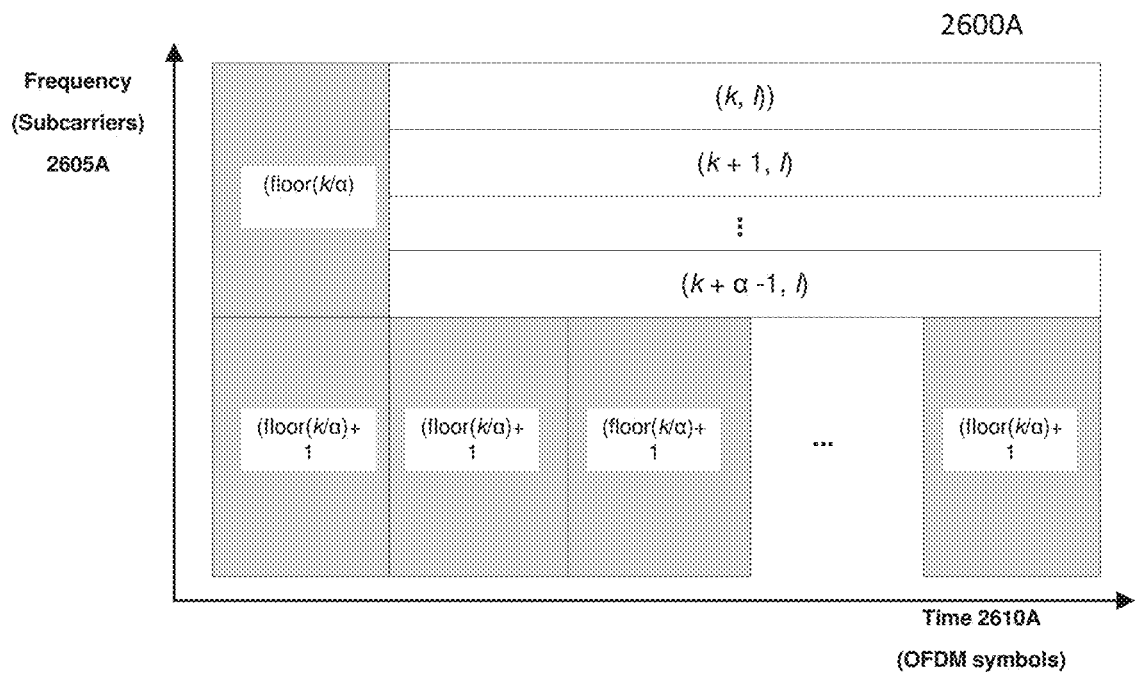
FIG. 26A illustrates a resource indexing according to embodiments of the present disclosure.

FIG. 26A 2600A illustrates a resource indexing according to embodiments of the present disclosure. An embodiment of the resource indexing shown in FIG. 26A 2600A is for illustration only. One or more of the components illustrated in FIG. 26A 2600A can be implemented in specialized circuitry configured to perform the noted functions or one or more of the components can be implemented by one or more processors executing instructions to perform the noted functions. Other embodiments are used without departing from the scope of the present disclosure. As shown in FIG. 26A 2600A, the resource indexing comprises a frequency (e.g., subcarrier) 2605A and a time (e.g., OFDM symbols) 2610A.

Figure 26B:
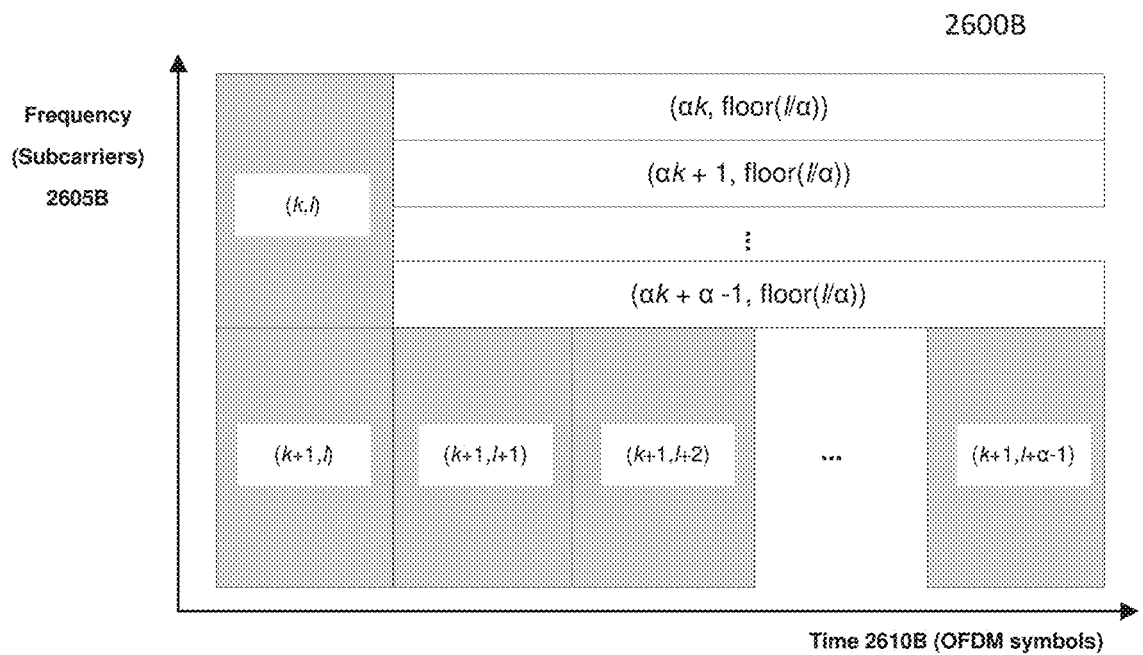
FIG. 26B illustrates another resource indexing according to embodiments of the present disclosure.

FIG. 26B 2600B illustrates another resource indexing according to embodiments of the present disclosure. An embodiment of the resource indexing shown in FIG. 26B 2600B is for illustration only. One or more of the components illustrated in FIG. 26B 2600B can be implemented in specialized circuitry configured to perform the noted functions or one or more of the components can be implemented by one or more processors executing instructions to perform the noted functions. Other embodiments are used without departing from the scope of the present disclosure. As shown in FIG. 26B 2600B, the resource indexing comprises a frequency (e.g., subcarrier) 2605B and a time (e.g., OFDM symbols) 2610B.

FIGS. 26A 2600A and 26B 2600B illustrate the resource indexing of the two resource grids corresponding to the default and the alternative numerologies according to these embodiments. In FIGS. 26A 2600A and 26B 2600B, it is assumed that $\alpha=1, 2, 4, 8, \ldots$ (i.e., $\alpha \geq 1$). Specifically, FIG. 26A 2600A illustrates a case where the default numerology has a narrower subcarrier spacing than the alternative numerology. Similarly, FIG. 26B 2600B illustrates a case where the default numerology has wider subcarrier spacing than the alternative numerology. In these FIGS. 26A 2600A and 26B 2600B, the shaded boxes correspond to the resource elements in the resource grid for the default numerology and white boxes correspond to the resource elements in the resource grid for the alternative numerology.

A UE acquires the resource element indexing (k,l) from the initial access signals (e.g., synchronization channels) on the resource grid with the default numerology. When the UE is also configured with the alternative numerology, the UE acquires the time-frequency resource indexing (k',l').

In some embodiment, in the case of subframe/slot aggregation (i.e., a TTI spans more than one time interval X), the DMRS is mapped on a subset of the subframes/slots (or time intervals) in a PDSCH subframe/slot aggregation comprising a number of subframes/slots (an aggregation of multiple time interval X). For example, DMRS is mapped only in the first subframe/slot (time interval X) of the aggregation.

Figure 27:
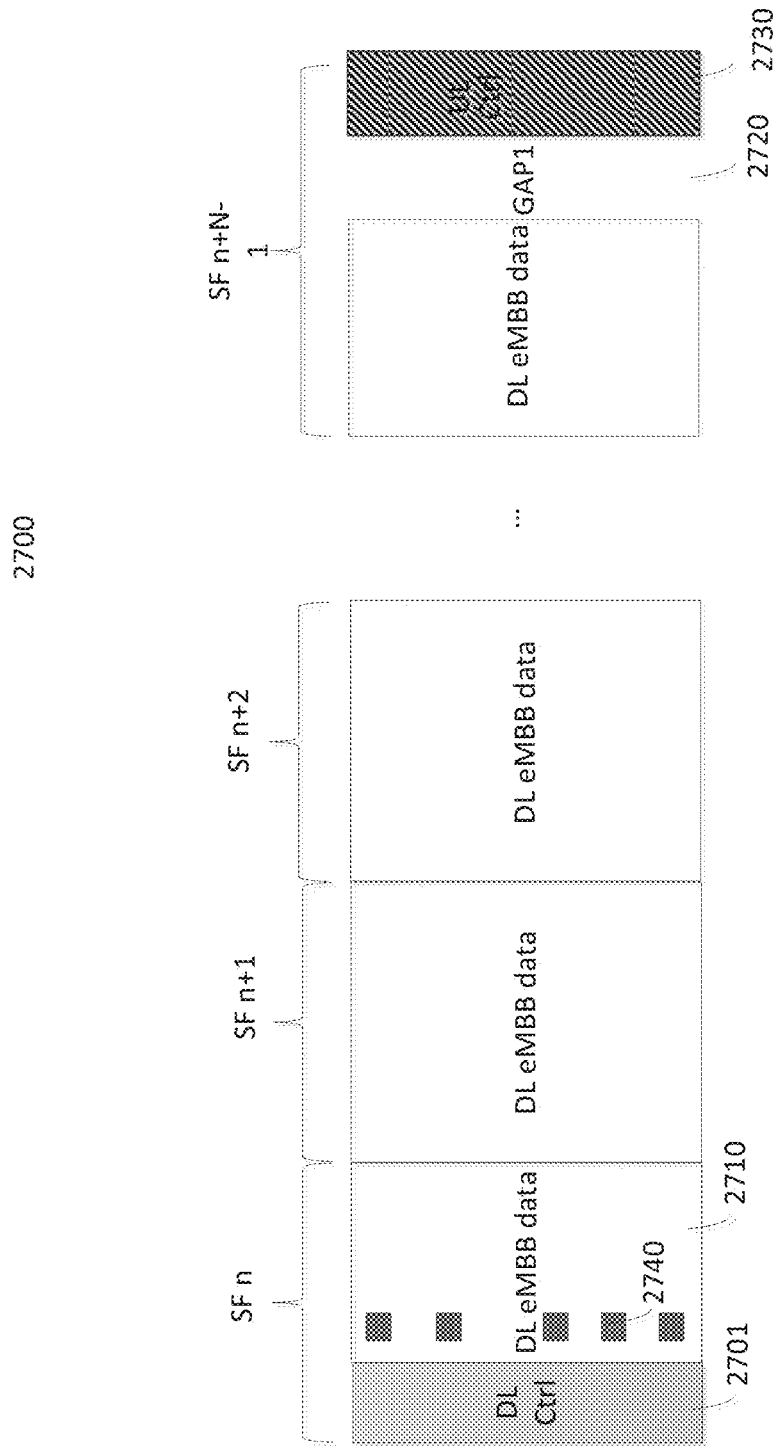
FIG. 27 illustrates a reference signal (RS) mapping in subframe aggregation according to embodiments of the present disclosure.

FIG. 27 2700 illustrates a reference signal (RS) mapping in subframe/slot aggregation according to embodiments of the present disclosure. An embodiment of the RS mapping in subframe shown in FIG. 27 2700 is for illustration only. One or more of the components illustrated in FIG. 27 2700 can be implemented in specialized circuitry configured to perform the noted functions or one or more of the components can be implemented by one or more processors executing instructions to perform the noted functions. Other embodiments are used without departing from the scope of the present disclosure. As shown in FIG. 27 2700, the RS mapping in subframe aggregation comprises a DL control 2701, a plurality of DL eMBB data 2710, a gap 1 2720, a UL control 2730, and a DMRS 2740.

As shown in FIG. 27 2700, a frame structure that maps DMRS only in one subframe/slot (time interval X) in an aggregation is illustrated. A UE is configured with an aggregation comprising N consecutive SFs/slots. The value of N is >=1. One example is that, for an eMBB service, a frame structure comprising multiple subframes/slots increases the transmission efficiency through less overhead.

As shown in FIG. 27 2700, an SF/slot n contains DL Ctrl 2701 and DL data 2710. The SF/slot n+N−1 contains DL data 2710, the Gap for DL and UL transmission GAP1 2720, and UL Ctrl 2730. The SF/slot n+1~n+N−2 contains the DL data 2710. In some embodiment, the DMRS 2740 for DL data transmission is only mapped in the SF n. The transmission of DMRS 2740 can be configured by the DL Ctrl 2701. The transmission of DMRS 2740 can be configured by upper layer through some RRC messages. Mapping the DMRS in the SF/slot n in subframe/slot aggregation enables to start the decoding of DL data 2710 as soon as possible. In some embodiment, the DMRS 2740 is mapped in any one or any some of SF n~n+N−1.

A signaling can be devised so that a UE can identify the mapping of DMRS 2740 in the case of subframe/slot (time interval) aggregation. 1-bit signaling for configuration of DMRS mapping is given in Table 4.

TABLE 4

| DMRS mapping configurations | DMRS mapping methods |
|---|---|
| State 0 | DMRS is mapped in all the time intervals (slots) |
| State 1 | DMRS is mapped in the first time interval (slot) only |

An example of 2-bit signaling for configuration of DMRS mapping is given in Table 5.

TABLE 5

| DMRS mapping configurations | DMRS mapping methods |
|---|---|
| State 00 | DMRS is mapped in all time intervals (slots) |
| State 01 | DMRS is mapped in the first time interval (slot) only. |
| State 10 | DMRS is mapped in odd numbered time intervals (slots), i.e., time interval {1, 3, 5, . . . } |
| State 11 | DMRS is mapped in the first time interval (slot) and other time intervals (slots) defined by bitmap $B = \{b_n b_{n+1} \ldots b_{n+N-1}\}$ |

In some embodiments, $b_n=1$ indicates that DMRS is mapped in time interval n while $b_n=0$ indicates the DMRS is not mapped in time interval n. In some embodiments, the bitmap is separately signaled in the higher-layer. In some embodiments, when the DMRS is not mapped in time interval x, the corresponding DMRS REs are used for xPDSCH mapping.

In some embodiments, the DMRS mapping information can be conveyed. In one example the DMRS mapping information can be conveyed via RRC signaling to notify the method of mapping DMRS in case of subframe/slot aggregation to the UE. In one example the DMRS mapping information can be conveyed on system information (SIB). In yet another example the DMRS mapping information can be conveyed via a dynamic DCI signaling in DL Ctrl. In such example, the information could include which subframe/slot(s) the DMRS is mapped into. In yet another example, the configuration of DMRS mapping is UE specific. The UE may derive the DMRS mapping based on some information of UE, for example, UE id. In yet another example, the configuration of DMRS mapping is service-specific. The UE may derive the DMRS mapping based on the type of scheduled service. In yet another example, the configuration of DMRS mapping is allocation-specific. The UE may derive the DMRS mapping based on the information of scheduled allocation, for example, the number of OFDM symbols of one allocation.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
    at least one processor configured to determine a first subcarrier spacing; and
    a transceiver configured to:
        transmit, to a base station (BS), random access signals generated with the first subcarrier spacing; and
        receive a downlink control signaling comprising a physical (PHY) resource configuration that includes a second subcarrier spacing, wherein the at least one processor is further configured to set the PHY resource configuration for at least one of uplink transmission or downlink reception.

2. The UE of claim 1, wherein:
the transceiver is further configured to:
receive the PHY resource configuration in a subband that is located on a center of a system bandwidth, the subband including downlink synchronization signals; and
perform the at least one of uplink transmission or downlink reception according to the PHY resource configuration.

3. The UE of claim 1, wherein the PHY resource configuration comprises a plurality of configurations that include a subcarrier spacing value and a subband, the subcarrier spacing value to be used for the subband for the at least one of uplink transmission or downlink reception.

4. The UE of claim 1, wherein the transceiver is further configured to receive a downlink control signaling comprising multiple PHY resource configurations each of which includes a subcarrier spacing value.

5. The UE of claim 1, wherein the PHY resource configuration further comprises information indicating an existence of a blank interval on boundaries of consecutive slots on which the UE is scheduled to receive a number of transport blocks.

6. The UE of claim 1, wherein the PHY resource configuration further comprises information to generate a reference signal scrambling sequence.

7. The UE of claim 1, wherein the PHY resource configuration comprises resources corresponding to at least one of ultra reliable and low latency (URLL) configuration information, enhanced mobile broadband (eMBB) configuration information, or massive machine type communication (mMTC) configuration information.

8. A base station (BS) in a wireless communication system, the BS comprising:
a transceiver is further configured to:
receive, from a user equipment (UE), random access signals generated with a first subcarrier spacing; and
transmit a downlink control signaling comprising a physical (PHY) resource configuration that includes a second subcarrier spacing; and
at least one processor configured to set the PHY resource configuration for at least one of uplink reception or downlink transmission.

9. The BS of claim 8, wherein the transceiver is further configured to:
transmit the PHY resource configuration in a subband that is located on a center of a system bandwidth, the subband including downlink synchronization signals; and
perform the at least one of uplink reception or downlink transmission according to the PHY resource configuration.

10. The BS of claim 8, wherein the PHY resource configuration comprises a plurality of configurations that includes a subcarrier spacing value and a subband, the subcarrier spacing value to be used for the subband for the at least one of uplink reception or downlink transmission.

11. The BS of claim 8, wherein the transceiver is further configured to transmit a downlink control signaling comprising multiple PHY resource configurations each of which includes a subcarrier spacing value.

12. The BS of claim 8, wherein the PHY resource configuration further comprises information indicating an existence of a blank interval on a boundaries of consecutive slots on which the UE is scheduled to receive a number of transport blocks.

13. The BS of claim 12, wherein the PHY resource configuration further comprises information to generate a reference signal scrambling sequence.

14. The BS of claim 8, wherein the PHY resource configuration comprises resources corresponding to at least one of ultra reliable and low latency (URLL) configuration information, enhanced mobile broadband (eMBB) configuration information, or massive machine type communication (mMTC) configuration information.

15. A method of user equipment (UE) in a wireless communication system, the method comprising:
determining a first subcarrier spacing;
transmitting, to a base station (BS), random access signals generated with the first subcarrier spacing;
receiving a downlink control signaling comprising a physical (PHY) resource configuration that includes a second subcarrier spacing; and
setting the PHY resource configuration for at least one of uplink transmission or downlink reception.

16. The method of claim 15, further comprising:
receiving the PHY resource configuration in a subband that is located on a center of a system bandwidth, the subband including downlink synchronization signals; and
performing the at least one of uplink transmission or downlink reception according to the PHY resource configuration.

17. The method of claim 15, wherein the PHY resource configuration comprises a plurality of configurations that includes a subcarrier spacing value and a subband, the subcarrier spacing value to be used for the subband for the at least one of uplink transmission or downlink reception.

18. The method of claim 15, further comprising receiving a downlink control signaling comprising multiple PHY resource configurations each of which includes a subcarrier spacing value.

19. The method of claim 15, wherein the PHY resource configuration further comprises information indicating an existence of a blank interval on boundaries of consecutive slots on which the UE is scheduled to receive a number of transport blocks.

20. The method of claim 15, wherein the PHY resource configuration further comprises information to generate a reference signal scrambling sequence.

* * * * *